US008799140B1

(12) United States Patent
Toffee et al.

(10) Patent No.: US 8,799,140 B1
(45) Date of Patent: Aug. 5, 2014

(54) FIXED INCOME MARKET MODEL SYSTEM

(75) Inventors: James Toffee, Summit, NJ (US); Frank DiMarco, Pleasantville, NY (US); Stanley Thomas Raatz, Princeton, NJ (US); William J. Gartland, Fairfield, CT (US)

(73) Assignee: Bloomberg Finance L.P., New York, NY (US)

( * ) Notice: Subject to any disclaimer, the term of this patent is extended or adjusted under 35 U.S.C. 154(b) by 139 days.

(21) Appl. No.: 13/303,077

(22) Filed: Nov. 22, 2011

Related U.S. Application Data

(60) Provisional application No. 61/416,165, filed on Nov. 22, 2010.

(51) Int. Cl.
*G06Q 40/04* (2012.01)
(52) U.S. Cl.
USPC ............................................. 705/37
(58) Field of Classification Search
CPC ..................................................... G06Q 40/04
USPC .......................................................... 705/37

See application file for complete search history.

(56) References Cited

U.S. PATENT DOCUMENTS

2001/0037284 A1* 11/2001 Finkelstein et al. ............ 705/37
2002/0188555 A1* 12/2002 Lawrence ........................ 705/37

* cited by examiner

*Primary Examiner* — Lindsay M. Maguire
(74) *Attorney, Agent, or Firm* — Frank J. DeRosa; Frommer Lawrence & Haug LLP

(57) ABSTRACT

Methods, systems, and apparatus, including computer programs encoded on a computer storage medium, for facilitating financial interactions relating to fixed income securities. In one aspect, a computer-based method for facilitating a transfer of a fixed income security includes receiving an indication from a computer-based interface device that a initiating party seeks a counterparty for a financial transaction involving the transfer of the fixed income security, accessing data in an electronic database relating to a plurality of potential counterparties for the financial transaction and assigning to one or more of the plurality of potential counterparties an indication as to likelihood that the potential counterparty will engage in the financial transaction. The indication of likelihood that the potential counterparty will engage in the financial transaction is based on the data in the electronic database.

39 Claims, 26 Drawing Sheets

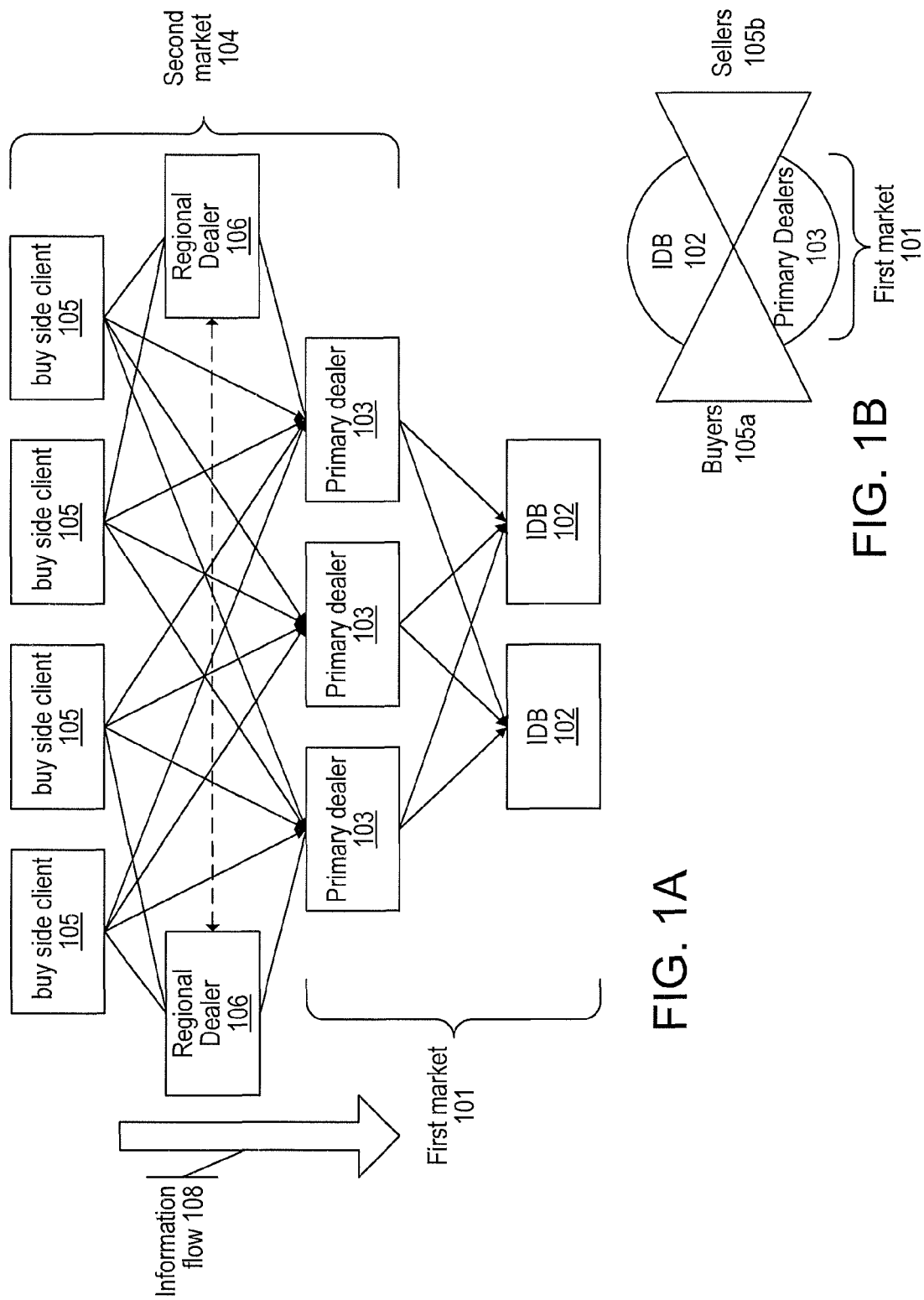

FIXED INCOME MARKET MODEL SYSTEM

CROSS-REFERENCE TO RELATED APPLICATIONS

This application claims the benefit under 35 U.S.C. §119 (e) of U.S. Patent Application No. 61/416,165, filed Nov. 22, 2010, the disclosure of which is incorporated by reference herein in its entirety.

FIELD OF THE DISCLOSURE

This disclosure relates generally to fixed income securities, and more particularly to a market model for the trading of fixed income securities.

BACKGROUND

Unlike equity securities, most fixed income securities (e.g., bonds) are currently bought and sold in the over the counter (OTC) market. The OTC market generally comprises securities firms and banks that trade fixed income securities either by phone or electronically. Some firms and banks act as dealers who keep an inventory, and buy and sell securities for their own account. Others act as brokers and buy from or sell to other dealers in response to specific requests for liquidity on behalf of their customers. As such, the current fixed income security model consists of manual, person-to-person exchanges in two different markets. The first market is the dealer to dealer market. The second market is the dealer to customer market. The first market generally trades with higher transparency than the second market, and with tighter bid offer spreads. The second market generally trades with lower transparency and wider bid-offer spreads.

SUMMARY

This specification describes technologies relating to a fixed income market model, including systems that can be used to implement the model.

In general, one innovative aspect of the subject matter described in this specification can be embodied in methods that include the actions of: receiving an indication from a computer-based interface device that an initiating party seeks a counterparty for a financial transaction involving the transfer of the fixed income security, accessing data in an electronic database relating to a plurality of potential counterparties for the financial transaction and assigning to one or more of the plurality of potential counterparties an indication as to the likelihood that the potential counterparty will engage in the financial transaction. The indication of likelihood that the potential counterparty will engage in the financial transaction is based on the data in the electronic database.

Other embodiments of this aspect include corresponding systems, apparatus, and computer programs, configured to perform the actions of the methods, encoded on computer storage devices.

In some implementations, the method includes ranking the potential counterparties based on the indication of likelihood assigned to each respective one of the potential counterparties. Moreover, some implementations include enabling the initiating party to view at a computer-based interface device one or both of: the assigned indications of likelihood that the respective potential counterparties will engage in the financial transaction; and the rankings of each potential counterparty based in the assigned indications of likelihood.

According to certain embodiments, the method includes enabling the initiating party to enter a request at the computer-based interface device that a Request For Quote (RFQ) be sent to a specified one or more potential counterparties identified by the initiating party to enter into the financial transaction. Still other embodiments include sending an inquiry over a computer network as to actual interest in participating in the financial transaction to: each of the specified one or more of potential counterparties, if any, and one or more of the potential counterparties with the highest assigned indication of likelihood that the potential counterparty will engage in the financial transaction. Sending the inquiries may be accomplished in a manner that does not reveal the identity of the initiating party.

In some implementations, the method includes receiving one or more responses to the inquiries sent from one or more of the potential counterparties; and enabling the initiating party to access information about the one or more responses at the computer-based interface.

In some of such implementations, enabling the initiating party to access the information is accomplished without revealing the identities of the responding potential counterparties.

In a typical implementation, multiple responses are received and the computer-based method includes combining two or more of the responses to create a single offer that satisfies requirements associated with completing the financial transaction based on information provided by the initiating party. The method can further include enabling the initiating party to view information about the single offer at the computer-based interface device. Moreover, the method can include enabling the potential counterparties, in responding to the inquiries, to specify an expiration time for an offer contained in their response.

At least one of the responses combined to create the single offer may have a specified expiration time and the information about the single offer changes upon expiration of the specified expiration time.

In some implementations, assigning to each respective one of the potential counterparties an indication of likelihood that the potential counterparty will engage in the financial transaction can include: determining, based on the data in the electronic database, one or more of the following: to what degree the potential counterparty is involved in current bids related to the fixed income security, to what degree the potential counterparty was involved in past bids related to the fixed income security, to what degree the potential counterparty was involved in completed transactions related to the fixed income security, to what degree the potential counterparty has expressed an interest related to the fixed income security, and to what degree the potential counterparty has portfolio holdings related to the fixed income security.

Assigning to each respective one of the plurality of potential counterparties an indication of likelihood that the potential counterparty will engage in the financial transaction can include: determining, based on the data in the electronic database, to what degree the potential counterparty is or was on the opposite side of other transactions from the side of the transaction desired.

Determining to what degree the potential counterparty is involved in current bids related to the fixed income security can include determining, based on the data in the electronic database, one or more of the following: to what degree the potential counterparty is involved in current bids for the fixed income security, to what degree the potential counterparty is involved in current bids for different fixed income securities with the same issuer as the fixed income security, to what degree the potential counterparty is involved in current bids for different fixed income securities in the same industry as the fixed income security, to what degree the potential counterparty is involved in current bids for different fixed income securities in the same maturity bracket as the fixed income security, to what degree the potential counterparty is involved in current bids for different fixed income securities with the same rating as the fixed income security, and to what degree the potential counterparty is involved in current bids for different fixed income securities with the same yield percentage as the fixed income security.

Determining to what degree the potential counterparty was involved in past bids related to the fixed income security can include determining, based on the data in the electronic database, one or more of the following: to what degree the potential counterparty was involved in past bids for the fixed income security, to what degree the potential counterparty was involved in past bids for different fixed income securities with the same issuer as the fixed income security, to what degree the potential counterparty was involved in past bids for different fixed income securities in the same industry as the fixed income security, to what degree the potential counterparty was involved in past bids for different fixed income securities in the same maturity bracket as the fixed income security, to what degree the potential counterparty was involved in past bids for different fixed income securities with the same rating as the fixed income security, and to what degree the potential counterparty was involved in past bids for different fixed income securities with the same yield percentage as the fixed income security.

Determining to what degree the potential counterparty was involved in completed transactions related to the fixed income security can include: determining, based on the data in the electronic database, one or more of the following: to what degree the potential counterparty has completed transactions including the fixed income security, to what degree the potential counterparty has completed transactions including different fixed income securities with the same issuer as the fixed income security, to what degree the potential counterparty has completed transactions including different fixed income securities in the same industry as the fixed income security, to what degree the potential counterparty has completed transactions including different fixed income securities in the same maturity bracket as the fixed income security, to what degree the potential counterparty has completed transactions including different fixed income securities with the same rating as the fixed income security, and to what degree the potential counterparty has completed transactions including different fixed income securities with the same yield percentage as the fixed income security.

Determining to what degree the potential counterparty has portfolio holdings related to the fixed income security can include determining, based on the data in the electronic database, one or more of the following: to what degree the portfolio of the potential counterparty includes the fixed income security, to what degree the portfolio of the potential counterparty includes different fixed income securities with the same issuer as the fixed income security, to what degree the portfolio of the potential counterparty includes different fixed income securities in the same industry as the fixed income security, to what degree the portfolio of the potential counterparty includes different fixed income securities in the same maturity bracket as the fixed income security, to what degree the portfolio of the potential counterparty includes different fixed income securities with the same rating as the fixed income security, and to what degree the portfolio of the potential counterparty includes different fixed income securities with the same yield percentage as the fixed income security.

In some implementations, the method of claim 12 includes enabling the initiating party and each of the plurality of potential counterparties to create respective virtual profiles, each of which can include an expression of interest in one or more characteristics associated with fixed income securities. Assigning to each respective one of the plurality of potential counterparties the indication of likelihood that the potential counterparty will engage in the financial transaction further comprises determining to what degree a virtual profile associated with one of the potential counterparties includes an expression of interest related to the fixed income security.

In certain embodiments, determining to what degree the potential counterparty has expressed interest related to the fixed security includes determining, based on the data in the electronic database, one or more of the following: to what degree the virtual profile associated with the potential counterparty includes an expression of interest in the fixed income security, to what degree the virtual profile associated with the potential counterparty includes expressions of interest in different fixed income securities with the same issuer as the fixed income security, to what degree the virtual profile associated with the potential counterparty includes expressions of interest in different fixed income securities in the same industry as the fixed income security, to what degree the virtual profile associated with the potential counterparty includes expressions of interest in different fixed income securities in the same maturity bracket as the fixed income security, to what degree the virtual profile associated with the potential counterparty includes expressions of interest in different fixed income securities with the same rating as the fixed income security, and to what degree the virtual profile associated with the potential counterparty includes expressions of interest in different fixed income securities with the same yield percentage as the fixed income security.

The method can include automatically inquiring, over the computer network, to what degree a selected one of the potential counterparties has an interest in conducting the financial transaction. The automatic inquiry is in response to a determination, based on the data in the electronic database, that the selected potential counterparty is or was involved in a bid or completed a transaction for the fixed income security.

Some embodiments of the method include enabling the initiating party and the potential counterparties to post and view orders at an electronic order book that is accessible from computer terminals coupled to the computer network.

In another aspect, a computer system facilitates financial transactions involving a transfer of a fixed income security. The computer system includes one or more user devices, typically computer terminals or hand held mobile computing devices and one or more computers operable to interact via a computer network with the one or more user devices. The one or more computers include a sales engine to receive an indication from a first one of the user devices that an initiating party seeks a counterparty for the financial transaction involving the transfer of the fixed income security, a matching engine to access, in an electronic database, data relating to a plurality of potential counterparties for the financial transaction and assign to one or more of the potential counterparties an indication of likelihood that the potential counterparty will engage in the financial transaction. Each indication of likelihood is based on the data in the electronic database.

In some implementations, the matching engine is further configured to rank the potential counterparties based on the indications of likelihood assigned to each respective one of the potential counterparties.

The one or more computers can be further adapted to enable the initiating party to view at the first one of the user devices at least one of: the assigned indications of likelihood that the respective potential counterparties will engage in the financial transaction; and the ranking of the plurality of potential counterparties. In certain embodiments, the one or more computers are further configured to enable the initiating party to enter a request at the first one of the user devices that a Request For Quote (RFQ) be sent to one or more potential counterparties specifically identified by the initiating party to enter into the financial transaction.

The sales engine can be further configured to send a request to: each of the one or more potential counterparties specifically identified by the initiating party, if any; and one or more of the potential counterparties having the highest assigned indications of likelihood that the potential counterparty will engage in the financial transaction. Moreover, in some implementations, the sales engine can send the requests without revealing the initiating party's identity to potential counterparties receiving the requests.

Typically, the sales engine receives one or more responses to the inquiries sent from one or more of the potential counterparties and the one or more computers are configured to make the responses available for viewing by the initiating party at the first one of the user devices. Making the responses available for viewing by the initiating party at the first one of the user devices can be accomplished without revealing an identity of the responding potential counterparties at the first one of the user devices.

In some implementations, the one or more computers further include a price aggregation engine to combine two or more of the responses to create a single offer that satisfies requirements associated with completing the financial transaction based on information provided by the initiating party. The one or more computers can be further configured to make information about the single combined offer available for viewing at the first one of the user devices.

In certain embodiments, the one or more computers are further configured to: enable the potential counterparties, in responding to the inquiries, to specify an expiration time for an offer contained in their response. At least one of the responses combined to create the single offer may have a specified expiration time and the information about the single offer may change based on the specified expiration time.

The matching engine, in assigning to each respective one of the potential counterparties an indication of likelihood that the potential counterparty will engage in the financial transaction, can be configured to determine, based on data in the electronic database, one or more of the following: to what degree the potential counterparty is involved in current bids related to the fixed income security, to what degree the potential counterparty was involved in past bids related to the fixed income security, to what degree the potential counterparty was involved in completed transactions related to the fixed income security, to what degree the potential counterparty has expressed an interest related to the fixed income security, and to what degree the potential counterparty has portfolio holdings related to the fixed income security.

The matching engine, in assigning to each respective one of the potential counterparties an indication of likelihood that the potential counterparty will engage in the financial transaction, can be configured to determine, based on the data in the electronic database, whether the potential counterparty is or was on the opposite side of other transactions from the side of the transaction desired.

The matching engine, in determining to what degree the potential counterparty is involved in current bids related to the fixed income security, can be configured to determine one or more of the following: to what degree the potential counterparty is involved in current bids for the fixed income security, to what degree the potential counterparty is involved in current bids for different fixed income securities with the same issuer as the fixed income security, to what degree the potential counterparty is involved in current bids for different fixed income securities in the same industry as the fixed income security, to what degree the potential counterparty is involved in current bids for different fixed income securities in the same maturity bracket as the fixed income security, to what degree the potential counterparty is involved in current bids for different fixed income securities with the same rating as the fixed income security, and to what degree the potential counterparty is involved in current bids for different fixed income securities with the same yield percentage as the fixed income security.

The matching engine, in determining to what degree the potential counterparty was involved in past bids related to the fixed income security, can be configured to determine one or more of the following: to what degree the potential counterparty was involved in past bids for the fixed income security, to what degree the potential counterparty was involved in past bids for different fixed income securities with the same issuer as the fixed income security, to what degree the potential counterparty was involved in past bids for different fixed income securities in the same industry as the fixed income security, to what degree the potential counterparty was involved in past bids for different fixed income securities in the same maturity bracket as the fixed income security, to what degree the potential counterparty was involved in past bids for different fixed income securities with the same rating as the fixed income security, and to what degree the potential counterparty was involved in past bids for different fixed income securities with the same yield percentage as the fixed income security.

The matching engine, in determining to what degree the potential counterparty was involved in completed transactions related to the fixed income security, can be configured to determine one or more of the following: to what degree the potential counterparty has completed transactions including the fixed income security, to what degree the potential counterparty has completed transactions including different fixed income securities with the same issuer as the fixed income security, to what degree the potential counterparty has completed transactions including different fixed income securities in the same industry as the fixed income security, to what degree the potential counterparty has completed transactions including different fixed income securities in the same maturity bracket as the fixed income security, to what degree the potential counterparty has completed transactions including different fixed income securities with the same rating as the fixed income security, and to what degree the potential counterparty has completed transactions including different fixed income securities with the same yield percentage as the fixed income security.

The matching engine, in determining to what degree the potential counterparty has expressed an interest related to the fixed income security, can be configured to determine one or more of the following: to what degree the portfolio of the potential counterparty includes the fixed income security, to what degree the portfolio of the potential counterparty includes different fixed income securities with the same issuer as the fixed income security, to what degree the portfolio of the potential counterparty includes different fixed income securities in the same industry as the fixed income security, to what degree the portfolio of the potential counterparty includes different fixed income securities in the same maturity bracket as the fixed income security, to what degree the portfolio of the potential counterparty includes different fixed income securities with the same rating as the fixed income security, and to what degree the portfolio of the potential counterparty includes different fixed income securities with the same yield percentage as the fixed income security.

In some implementations, the one or more computers are further configured to: enable the initiating party and each of the plurality of potential counterparties to create respective virtual profiles, each of which can include an expression of interest in one or more characteristics associated with fixed income securities. Assigning to each respective one of the plurality of potential counterparties the indication of likelihood that the potential counterparty will engage in the financial transaction further includes determining to what degree a virtual profile associated with one of the potential counterparties includes an expression of interest related to the fixed income security.

The matching engine, in assigning to each respective one of the plurality of potential counterparties an indication of likelihood that the potential counterparty will engage in the financial transaction, can be configured to determine one or more of the following: to what degree the virtual profile associated with the potential counterparty includes expressions of interest in the fixed income security, to what degree the virtual profile associated with the potential counterparty includes expressions of interest in different fixed income securities with the same issuer as the fixed income security, to what degree the virtual profile associated with the potential counterparty includes expressions of interest in different fixed income securities in the same industry as the fixed income security, to what degree the virtual profile associated with the potential counterparty includes expressions of interest in different fixed income securities in the same maturity bracket as the fixed income security, to what degree the virtual profile associated with the potential counterparty includes expressions of interest in different fixed income securities with the same rating as the fixed income security, and to what degree the virtual profile associated with the potential counterparty includes expressions of interest in different fixed income securities with the same yield percentage as the fixed income security.

The sales engine, in some embodiments, is further adapted to: automatically inquire, via the computer network, to what degree a selected one of the potential counterparties wants to conduct the financial transaction in response to a determination, based on the data in the electronic database, that the selected potential counterparty is or was involved in a bid for the fixed income security or completed a transaction for the fixed income security.

According to certain embodiments, the one or more computers are further configured to enable the initiating party and the potential counterparties to post and view orders at an electronic order book that is accessible from computer terminals coupled to the computer network.

In some implementations, the one or more user devices include one or more of the following: a computing device running a web browser, a spreadsheet add-in, an order management system, an application programming interface, a financial information exchange program or the like.

In yet another aspect, a computer-based method is disclosed for processing offers received from potential counterparties to engage in a proposed financial transaction involving a transfer of a fixed income security. The potential counterparties include one or more potential counterparties specifically identified by an initiating party as a potential counterparty to the financial transaction and one or more potential counterparties selected by a computer-based matching engine as being likely interested in the proposed financial transaction. The computer-based method includes receiving one or more offers from the potential counterparties specifically identified by the initiating party, receiving one or more offers from the potential counterparties selected by the computer-based matching engine; and identifying, among the received offers, one or more of the received offers that alone or collectively provide the initiating party a best price for a quantity of the fixed income security that satisfies requirements of the proposed financial transaction.

Certain implementations include enabling the initiating party to access information about the one or more received offers that alone or collectively provide the initiating party the best price for the quantity of the fixed income security that satisfies requirements of the proposed financial transaction. More than one of the received offers can be combined to collectively satisfy the requirements of the proposed financial transaction.

In some implementations, at least one of the more than one received offers combined to satisfy the requirements of the proposed financial transaction has an associated duration, after which the offer will expire. The information about the received offers that the initiating party can access is updated upon expiration of the associated duration to reflect a new best price for the quantity of fixed income security that satisfies requirements of the proposed financial transaction. The system can receive the indication of the associated duration along with an associated one of the received offers from one of the potential counterparties.

In some implementations, one or more of the following advantages are present.

For example, participants in the fixed income securities market may enjoy more access to helpful data about the market. Additionally, the participants are able to access a larger pool of liquidity than was previously possible. Moreover, interactions between initiating parties and potential counterparties are greatly facilitated.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is schematic diagram representing exemplary relationships among various parties in a two-tiered fixed income securities market.

FIG. 1B is a schematic representation of buyer and seller interactions in the two-tiered fixed income securities market of FIG. 1A.

FIGS. 8A-8F are exemplary screenshots of the display that an initiating party sees when accessing certain functionality associated with the computer-based platform of FIG. 2A.

DETAILED DESCRIPTION

Figure 1C:
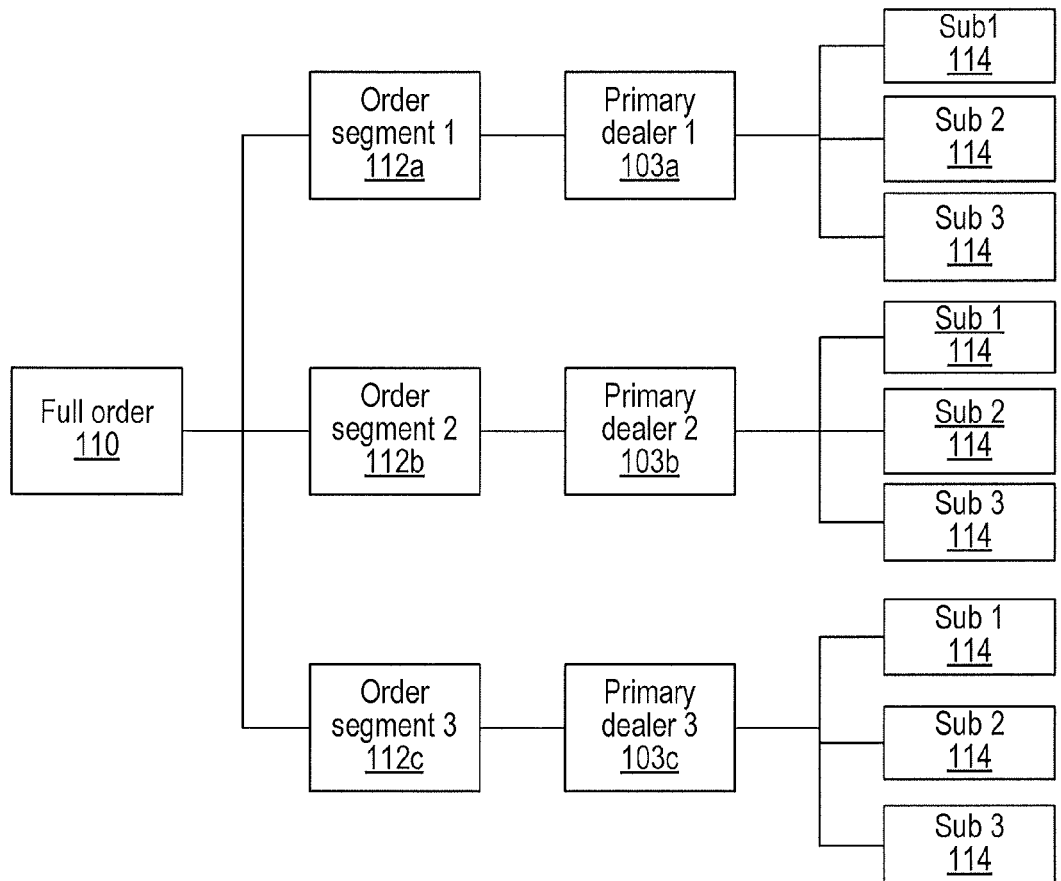
FIGS. 1C and 1D are schematic representations showing orders being filled in the two-tiered fixed income securities market of FIG. 1A.

The following is a disclosure of a fixed income market model, as well as various methods and systems for implementing such a model.

Overview and Fundamentals

An overview of the art is provided to assist the reader's appreciation of the context of this specification, as well as some of the problems that can be solved by certain implementations of systems and methods described herein.

As mentioned, the current fixed income security model consists of manual, person-to-person exchanges in two different markets. The first market is the dealer to dealer market. Institutional investors rely on the dealer to dealer market to (1) find or provide liquidity for securities, (2) locate the best price on those securities, and (3) match buyers and sellers to execute desired trades. When looking to transact in fixed income securities in the dealer to dealer market, investors must give an indication of their intention to trade (sometimes referred to as "indications of interest" or simply "IOIs"). This indication can be given in many forms, e.g., emails, phone calls, bid lists, and axe sheets. In theory, these sources combine to create a small measure of market data on what are generally regarded to be relatively illiquid securities. As a result of the incompleteness of this market data, by some estimates, 97% of the corporate bond market is "dark"—in general, there are no real-time prices available during the day.

Within the bond market generally, there are two ways to find liquidity: inventory based or inquiry based. Inventory based discovery is based on IOIs distributed by dealers (e.g., phone calls, emails, axe sheets, dealer runs, etc.). These IOI's indicate liquidity, but they are generally not executable, and since they are not updated over the course of the day, they are not up to date.

On the other hand, inquiry based discovery is based on market participants who want to trade specific securities. The party that wants to trade generally uses a broker to find a trading partner. It is difficult for brokers to initiate trades, especially large trades, without having the market move against them due to the amount of liquidity they are placing on the market (e.g., pricing moving down with a large sell or prices moving up with a large buy). Additionally, a lack of transparency in the market makes it difficult for customers of brokers to assess the quality of execution of trades.

Market participants can only trade in the market if they know where to search for liquidity. For that reason, customers (e.g., investors and their brokers) tend to trade with dealers, who hold proprietary information about where to locate liquidity. Due to this information disparity, dealers are able to trade with other dealers in a fairly transparent marketplace, while customers do not have access to that marketplace. To trade, the customer must give up large amounts of information to the dealer, which perpetuates the existing information disparity. This leads to the two tiered marketplace already described.

To trade large volumes, market participants (in this case, either customers or dealers) must expose their order either entirely to one dealer, or to the market through multiple dealers. Information leakage is a significant issue in these situations, and the use of multiple dealers causes significant increases in execution costs. Further, fragmentation of the marketplace leads to significant increases in custodial fees. Although involving more than one counterparty is often necessary to insure best execution (i.e., executing portions of an order against multiple, smaller, better priced counterparts as opposed to executing a whole order against a single, larger, worse priced counterpart), that amplifies the effects of fragmentation in the market. This creates significant enough friction in the market that some entities have started providing services such as "single ticket clearing" to aggregate custodial fees.

The transparency in the first market (dealer to dealer) has benefitted dealers, granting them an "information arbitrage" over their customers who must participate in the second market (dealer to customer). Part of this is due simply to the fact that institutional customers do not have access to the existing dealer to dealer market. In reality, however, giving customers access to the dealer to dealer market would present customers with a different, more fundamental set of problems that plague the fixed income market. Such problems include a lack of real-time market data and a lack of systems for (1) aggregating and presenting that real-time market data, (2) finding liquidity without having to expose orders to the entire market, and (3) initiating and responding to trades.

By way of illustration, FIG. 1A shows an example of a two tier marketplace. In the illustrated marketplace, the first market 101 is a marketplace in which primary dealers 103 compete. The primary dealers 103 have access to several Inter-Dealer Broker systems (IDB) 102. The primary dealers 103 trade with each other using the IDB systems 102 in the first market 101. The IDB systems 102 include automated systems for posting and viewing available liquidity in the fixed income security marketplace, but are generally only available to dealers. The data contained in the IDB systems 102 thus provide a limited view of the state of the fixed income security market.

The first market 101 carries large amounts of information, with a fairly open flow of information between the primary dealers 103. This leads to a first market 101 that is generally more transparent and has lower bid—ask spreads than the second market 104.

The second market 104, on the other hand, includes traditional buy side clients 105 trading with the primary dealers 103. To trade, the traditional buy side clients 105 generally give substantial amounts of information 108 to the primary dealers 103 so that the primary dealers 103 can generate quotes. Because of the information disparity that this creates, the second market 104 generally trades with much lower transparency and much larger bid—ask spreads than the first market 101.

Regional dealers 106 occasionally exist between traditional buy side clients 105 and primary dealers 103. Although the regional dealers 206 may trade with each other, they generally do not have access to IDBs 102, and therefore cannot access the majority of information and efficiencies produced in the first market 101. Regional dealers 106 often use primary dealers 103 in order to access liquidity.

FIG. 1B is a schematic representation of the fixed income security market of FIG. 1A, with buyers 105*a* and sellers 105*b* trying to reach each other, but being constrained largely by first market 101 (represented by the pinch point between the two sides of the bowtie shape). Within the first market 101, the primary dealers 103 use the IDB systems 102 to deal with each other, and then transmit the securities from buyer 105*a* to seller 105*b*. The buyers 105*a* and the sellers 105*b* give a lot of information to the primary dealers 103, but the primary dealers 103 give very little information back to them.

FIG. 1C is a schematic representation of a full order 110 (e.g., from a first one of the market participants 105 in FIG. 1A) being split into three separate order segments 112*a*, 112*b*, 112*c*. This can be desirable if, for example, the full order is too large to be satisfied by a single counterparty. The order segments 112*a*, 112*b*, 112*c* may be the same size as one another or may be different sizes.

According to the illustrated implementation, each order segment 112*a*, 112*b*, 112*c* is sent to a separate one of the primary dealers 103*a*, 103*b*, and 103*c*. Each primary dealer 103*a*, 103*b*, 103*c* exposes details of its own order segment 112*a*, 112*b*, 112*c* to the marketplace (including, for example, multiple buy side clients 105).

In the illustrated embodiment, each primary dealer 103*a*, 103*b*, 103*c* separately settles multiple sub accounts 114 to satisfy its own order segment 112*a*, 112*b*, and 112*c*. More particularly, in the illustrated implementation, each primary dealer 103*a*, 103*b*, 103*c* separately settles three sub accounts 114 to satisfy its own order segment. This leads to nine settlements between the three different primary dealers 505, each of which typically requires separate processing and payment of associated fees.

Figure 1D:
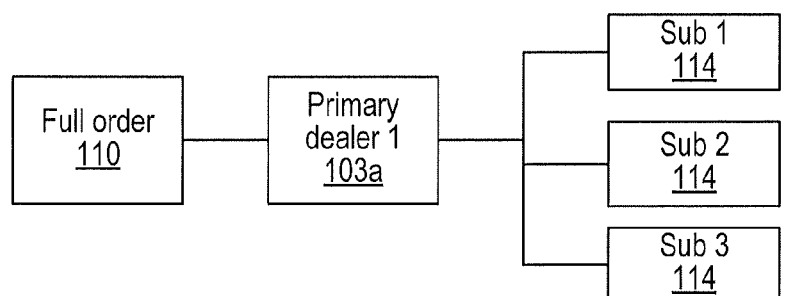

FIG. 1D shows an alternate scenario whereby the market participant (e.g., one of the buy side clients 105 of FIG. 1A) is willing to expose its full order 110 to a single primary dealer 103*a*.

In the illustrated scenario, the primary dealer 103*a* routes the order to multiple sub accounts 114. More particularly, the primary dealer 103*a* in the illustrated scenario routes the order to three different sub accounts 114. Using a single dealer for a large purchase typically results in the purchaser receiving a weak price due, at least in part to interacting with a single primary dealer, and the information disadvantage inherent in giving that single primary dealer all of the relevant information about the desired exchange. Additional fees are also incurred by having to pay for processing and associated fees in connection with the separate settlement of the different sub accounts 114.

The Single Tier Fixed Income Market Model

An implementation of a single tier fixed income market model employs a trading system platform that comprises an "all-to-all" protocol, replacing the previous customer to dealer and dealer to dealer marketplaces. This market model provides for direct trading of fixed income securities between institutional investors, brokers, and others. Trading in such a system can be automated.

Figure 2A:
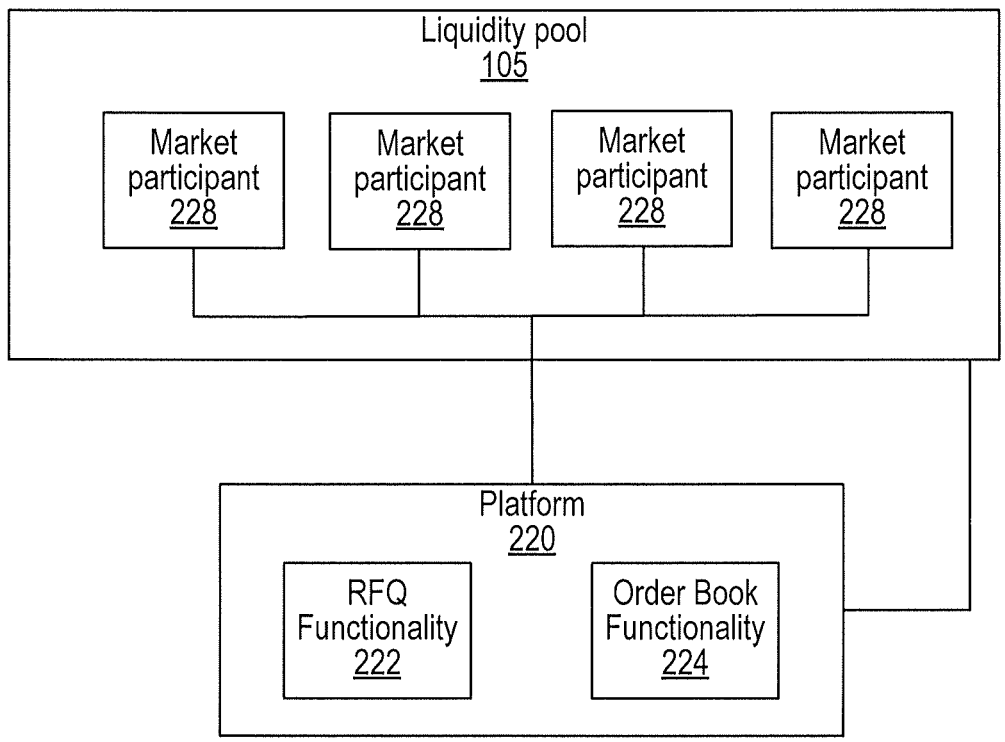
FIG. 2A is schematic diagram representing exemplary relationships among market participants in a single-tiered fixed income securities market that includes a computer-based platform to facilitate financial transactions between the market participants.

FIG. 2A shows an implementation of the single tier fixed income market model. The market model is implemented using a trading system platform 220 (shown simplified for clarity). The system platform 220 is adapted to support a computer-based all-to-all, request-for-quotation ("RFQ") functionality 222 and an order book functionality 224. In general, the RFQ functionality enables users (e.g., market participants 228) to request quotations from other users for a desired financial transaction involving the transfer of one or more fixed income securities. In general, the order book functionality provides each user with a listing of assets that the various users have orders posted for.

As discussed in further detail herein, the market participants 228 can access the system platform 220 from computer terminals, handheld mobile devices, or the like that are coupled to the system platform 220, for example, by a computer network, such as the Internet.

In some implementations, the RFQ functionality 222 of the system platform 220 can enable market participants 228 (e.g., buyers and sellers) to find counterparty buyers and sellers. Typically, this functionality relates to traditionally illiquid securities, such as bonds. Additionally, the system platform 220 typically can be used by market participants 228 to investigate multiple bids or offers on one or more bonds. The market participants 228 also typically can send RFQ's to one or more designated parties or can use other modules described herein to seek out and interact with likely counterparties. Market participants 228 can choose to either remain anonymous or expose themselves and/or their preferences to one or more of the potential counterparties.

In some implementations, the order book functionality 224 enables market participants to access various trading opportunities posted by other market participants. This information can be presented in a variety of ways and may be searchable, sortable, etc.

Figure 2B:
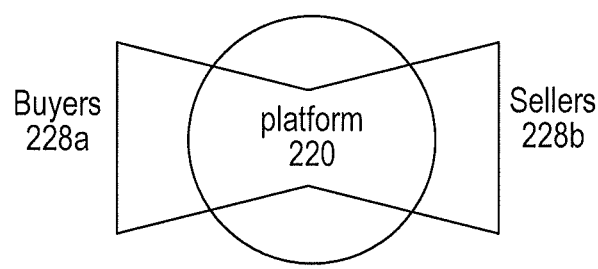
FIG. 2B is a schematic representation of buyer and seller interactions in the single-tiered fixed income securities market of FIG. 2A.

FIG. 2B is a schematic representation of the fixed income security market of FIG. 2A, with buyers 228*a* and sellers 228*b* able to deal directly with each other using the platform 220 as a link.

Figure 2C:
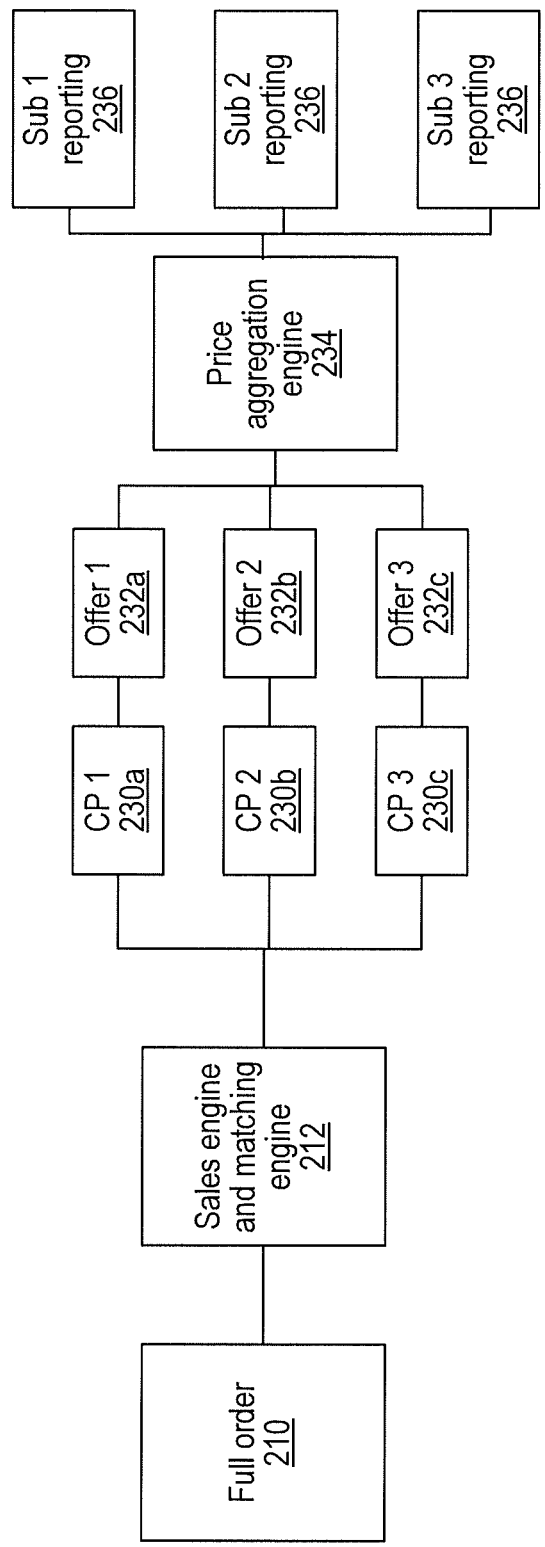
FIG. 2C is a schematic representation showing an order being filled using the RFQ functionality of the single-tiered fixed income securities market of FIG. 2A.

FIG. 2C is a schematic representation of the platform 220 facilitating a financial transaction that involves the transfer of fixed income securities from an initiating party to multiple counterparties 230*a*, 230*b*, 230*c*.

According to the illustrated implementation, the initiating party submits a full order 210, which includes all of the fixed income securities that the initiating party wants to transfer, to the platform 220 by accessing the platform's RFQ functionality. The full order 210 is processed by a sales engine and matching engine 212, which are part of the platform 220, to identify potential counterparties 230*a*, 230*b*, 230*c* that the matching engine determines to be most likely to engage in the financial transaction. The sales engine then contacts the potential counterparties 230*a*, 230*b*, 230*c* identified by the matching engine. The counterparties 230*a*, 230*b*, 230*c* return their respective offers 232*a*, 232*b*, and 232*c*.

In the illustrated example, none of the offers 232*a*, 232*b*, 232*c* is capable on its own of fully satisfying the requirements (e.g., to supply enough volume) associated with the full order 210. However, the offers 232*a*, 232*b*, 232*c* can be combined to satisfy the requirements associated with the full order 210. The offers 232*a*, 232*b*, 232*c* are then processed by a price aggregation engine 234, which is part of platform 220, to combine them and generate the best possible single price for the initiating party at which the full order 210 can be satisfied.

In the illustrated example, the aggregation engine completes the order, reports it on a single ticket, and reports 236 the order to three separate subaccounts at the same price. When a transaction is completed, it often needs to be distributed to multiple accounts. For example, a fund manager often handles multiple mutual funds. When the manager completes a trade and distributes, the system can distribute it all at the one aggregated price instead of the fund manager having to handle multiple transactions, asset allocations, and fees. Note that from the perspective of the initiating party, all trades are completed at the aggregated price. The results are therefore calculated, processed, and distributed at that price. However, from the perspective of the parties responding to RFQs, the trades are at the prices they proposed. Typically, this is possible due to the system, as a riskless principal, existing in between the parties.

Overview of an Example System for Implementing a Fixed Income Market Model

Figure 3:
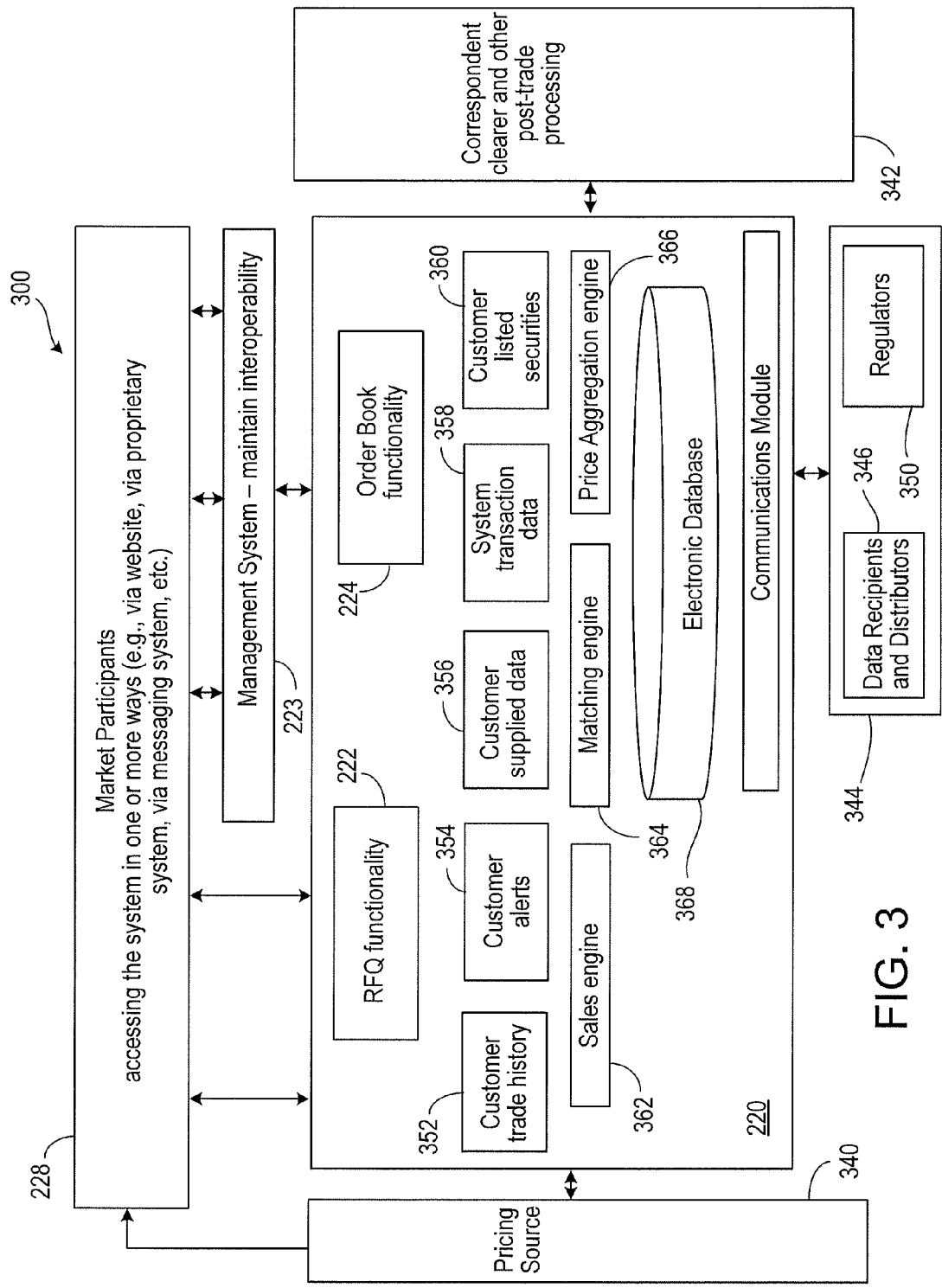
FIG. 3 is a schematic diagram of an exemplary system that includes a detailed example of the computer-based platform in FIG. 2A.

To implement a single tier fixed income security market (e.g., as described in FIGS. 2A to 2C), a platform 220 (e.g., a network of computer devices) can facilitate communications and interactions between various market participants 228. FIG. 3 is a schematic representation of an exemplary system 300 that includes an implementation of such a platform 220. In general, the illustrated platform 220 is configured to implement both RFQ functionality 222 and order book functionality 224.

In most implementations, the platform is administrated by a business entity. In the implementation shown in FIG. 3, the portions of the system within box 220 would be operated by the administrator of the business entity. Of course, this does not mean that the portions operated by the administrator must be located in the same physical location or that an administrator could not use a third party to assist in administering the platform 220. Elements within box 220 generally constitute a sales engine 362, a matching engine 364, a price aggregation engine 366 and an electronic database 368.

The market participants 228 can interact with the platform 220 in a variety of ways. For example, the platform 220 can be accessed directly through the internet or a spreadsheet add-in, or through the users' order management systems (OMS) alongside an execution management system (EMS) 223. Users can communicate with the EMS 223 using several systems, including proprietary management systems and custom Application Programming Interfaces (API). Additionally, the EMS 223 can communicate with the platform 220 using industry standard messaging, such as Financial Information Exchange (FIX). Generally, each of the market participants interacts with the platform from a remote location; accordingly, communication between market participants and the platform 220 is usually accomplished using known communication means, such as wired and/or wireless networking.

The illustrated platform 220 includes a sales engine 362, a matching engine 364 and a price aggregation engine 366, which can be implemented, for example, with hardware, software or a combination thereof. The illustrated platform 220 also includes an electronic database 368, which can store various information discussed herein and various other information to facilitate the platform's functionality. The platform 220 has several data libraries, which may be stored in the electronic database or may be stored electronically elsewhere. These include data libraries for customer trade history 352, customer alerts 354, customer supplied data 356, system transaction data 358 and customer listed securities 360. In various implementations, the platform 220 includes other data libraries and/or organizes data into different data libraries. As discussed herein, the platform 220 is generally operable to leverage the data stored in these data libraries and/or in the data stored in the electronic database 368 to support the functionality disclosed herein.

The platform 220 is coupled for communications with post-trade and clearing systems 342. In a typical implementation, after the platform generates or matches a trade, the trade is passed to these systems to provide services associated with post-trade operations and clearing.

The platform 220 is also coupled for communications with a pricing source 340. In some implementations, the pricing source 340 provides pricing estimates to the platform 220 to help facilitate the functionalities discussed herein.

The platform is also coupled for communications with other parties 344, which may include, for example, data recipients/distributors 348 and regulators 350. In a typical implementation, the data recipients/distributors may include various parties that pay to access data associated with the financial transactions facilitated by the platform 220. In a typical implementation, the platform stores transactional and associated statistical data about the transactions facilitated by the platform 220. This and other information may be reported out to the other parties and/or used by the system itself to help identify preferences, for example, of various market participants 228.

Figure 4:
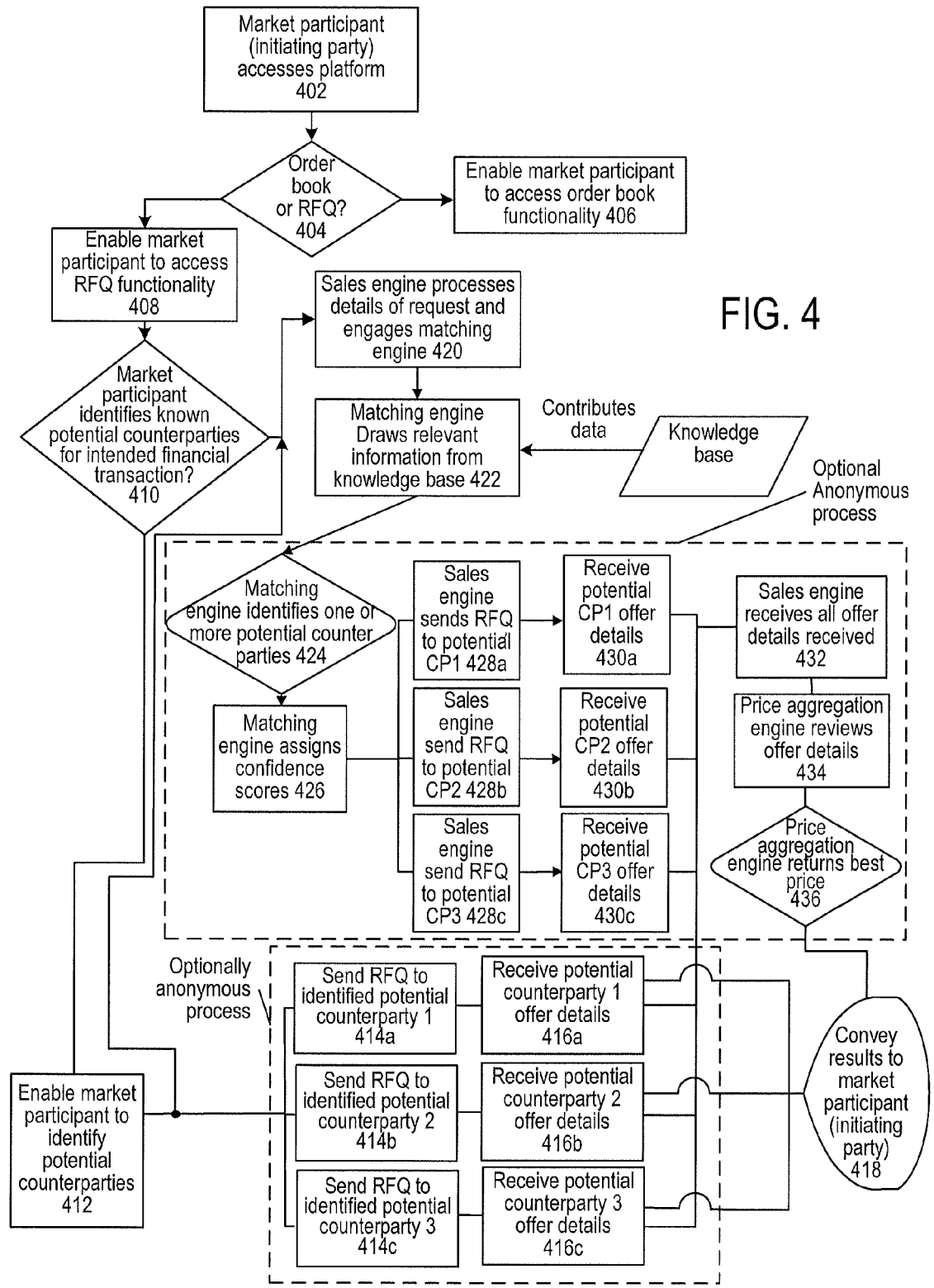
FIG. 4 is a flowchart of an exemplary method in which the computer-based platform in FIG. 2A facilitates financial transactions between market participants.

FIG. 4 shows exemplary interactions between a market participant (e.g., a party seeking to initiate a financial transaction) and the platform 220.

According to the illustrated method, the market participant accesses (at 402) the platform, including its associated functionality. As discussed above, this can be done in a number of ways. Typically, access is gained from a computer device (i.e., a user terminal) located at the market participant's physical location.

The platform 220 then enables the market participant (at 404) to choose between accessing either the platform's order book functionality or request for quotation ("RFQ") functionality. This can be accomplished, for example, by presenting a prompt to the market participant to select one of the functionalities or the other.

If the market participant (at 404) chooses to access the platform's order book functionality, then the platform 220 (at 406) enables the market participant to access the order book functionality. In a typical implementation, the platform 220 does this by presenting at the market participant's user interface the information associated with the order book functionality. For example, in response to the market participant selecting a hyperlink associated with the order book functionality, the platform 220 may cause one or more webpages to become available for viewing at the market participant's user interface. The one or more webpages, in that example, may include a list (or lists) of fixed income securities that other market participants have listed within the order book as being available for purchase or sale.

The list (or lists) of fixed income securities available for purchase can be organized and presented to the market participant in a number of formats. In a typical implementation, the market participant may browse and/or search the list (or lists) as desired and follow-up accordingly if the market participant has an interest in purchasing a particular one of the listed fixed income securities.

If the market participant chooses (at 404) to access the platform's RFQ functionality, then the platform 220 enables (at 408) the market participant to access the platform's RFQ functionality. In a typical implementation, the platform 220 does this by presenting at the market participant's user interface information associated with the RFQ functionality. For example, in response to the market participant selecting a hyperlink associated with the RFQ functionality, the platform 220 may cause one or more webpages associated with the RFQ functionality to become available for viewing at the market participant's user interface.

In the illustrated implementation, the platform 220 (at 410) enables the market participant to indicate whether/to what degree there are any potential counterparties that the market participant is aware of that may be interested in participating in the financial transaction that the market participant is proposing.

If the market participant (i.e., the initiating party) indicates (at 410) that there is one or more potential counterparties that the market participant is aware of that may be interested in participating in the financial transaction, then the platform 220 (at 412) enables the market participant to identify those parties to the platform 220. This may be accomplished, for example, by presenting, at the user interface, a form that the market participant can fill in with identifying data and other data about the one or more potential counterparties.

In the example represented by the illustrated implementation, the market participant identifies three potential counterparties that the market participant is aware of that may be interested in participating in the financial transaction. In a typical implementation and, as shown, the platform 220, when prompted, sends a Request For Quote (RFQ) (at 414a, 414b, 414c) to each one of the three identified potential counterparties. In some implementations, the RFQs are sent electronically, for example, by email, messaging or similar means.

In the example represented by the illustrated implementation, the platform 220 receives (at 416a, 416b, 416c) offer details back from all three of the identified counterparties.

According to the illustrated embodiment, the offer details (e.g., volume and price quoted by each of the three respective potential counterparties) are conveyed to the market participant (at 418). In a typical implementation, this is accomplished by presenting the offer details either on a website, or in an email, or electronic message, etc., which can be accessed by the market participant (i.e., the initiating party).

In some implementations, the platform 220 sends the RFQs confidentially (i.e., without revealing to the potential counterparties the initiating party's identity). This can be done automatically or, in some implementations, the platform 220 enables the initiating party to specify that the RFQs 414a, 414b, 414c be sent anonymously. In response to an initiating party's request in this regard, the platform 220 sends the RFQs (at 414a, 414b, 414c) to the identified potential counterparties anonymously (i.e., without revealing to the potential counterparties the initiating party's identity).

Similarly, in some implementations, the platform 220 automatically conveys the offer details it receives to the initiating party anonymously (i.e., without revealing the identity of the corresponding potential counterparty to the initiating party).

Regardless of whether the market participant (i.e., the initiating party) identifies (at 410) one or more potential counterparties that the market participant is aware of that may be interested in participating in the financial transaction, in the illustrated implementation, the platform 220 helps the market participant to find one or more other potential counterparties that the market participant has not identified that may be interested in participating in the financial transaction.

In a typical implementation, the platform's sales engine 362, in response to a prompt from the market participant, processes the details of the market participant's request (at 420) and engages the matching engine 364 to identify one or more potential counterparties that are likely to participate in the financial transaction.

Then, drawing (at 422) on relevant information contained within the platform's knowledge base (e.g., one or more of information in the electronic database 368, customer trade history data 352, customer alerts information 354, customer supplied data 356, system transaction data 358, customer listed securities 360 and other data), the matching engine 364 identifies (at 424) one or more potential counterparties that, based on the information, would be likely to participate in the proposed financial transaction.

In the illustrated implementation, for each of the one or more potential counterparties identified, the matching engine 364 assigns confidence scores (at 426) to each respective one of the one or more potential counterparties identified by the matching engine. In general, the confidence scores are intended to reflect how likely each of the respective potential counterparties is to enter into the proposed financial transaction. In a typical implementation, the matching engine calculates the confidence scores by considering a number of different characteristics associated with each one of the potential counterparties and increasing or decreasing a numeric tally for that potential counterparty depending on the specifics of each characteristic considered.

In some implementations, the matching engine 364 ranks the potential counterparties according to the assigned confidence scores. Information related to the identified counterparties, the assigned confidence scores and/or the top (i.e., most likely to participate) potential counterparties, is returned to the sales engine 362.

In the illustrated implementation, the sales engine 362 sends an RFQ (at 428a, 428b, 428c) to the top three potential counterparties most likely to participate (at 428a, 428b, 428c). In some implementations, this is done automatically in response to the sales engine 362 receiving information identifying the top potential counterparties from the matching engine 364. However, in some implementations, the sales engine 362 may prompt the initiating party for instructions in this regard before sending the RFQs.

In some implementations, the platform 220 sends the RFQs confidentially (i.e., without revealing to the potential counterparties the initiating party's identity). This can be done automatically or, in some implementations, the platform 220 enables the initiating party to specify if the RFQs 428a, 428b, 428c be sent anonymously. In response to an initiating party's request in this regard, the platform 220 sends the RFQs (at 428a, 428b, 428c) to the identified potential counterparties anonymously (i.e., without revealing to the potential counterparties the initiating party's identity).

In the example represented by the illustrated implementation, the platform 220 receives (at 430a, 430b, 430c) offer details back from all three of the potential counterparties (CP1, CP2, and CP3).

According to the illustrated implementation, the sales engine 362 (at 432) receives all offer details received. This includes the offer details received (at 416a, 416b, 416c) from the potential counterparties identified by the initiating party as well as the offer details received (at 430a, 430b, 430c) from the potential counterparties identified by the matching engine 364.

The sales engine 362 forwards information about all of the offer details to the price aggregation engine 366. The price aggregation engine 366 (at 434) reviews the various offer details and returns the best possible price (436) either from among the various offers or by combining various offers.

The platform 220 conveys the best possible price as determined by the price aggregation engine, to the market participant 418 in addition to the offer details from the requested counterparties.

Figure 5:
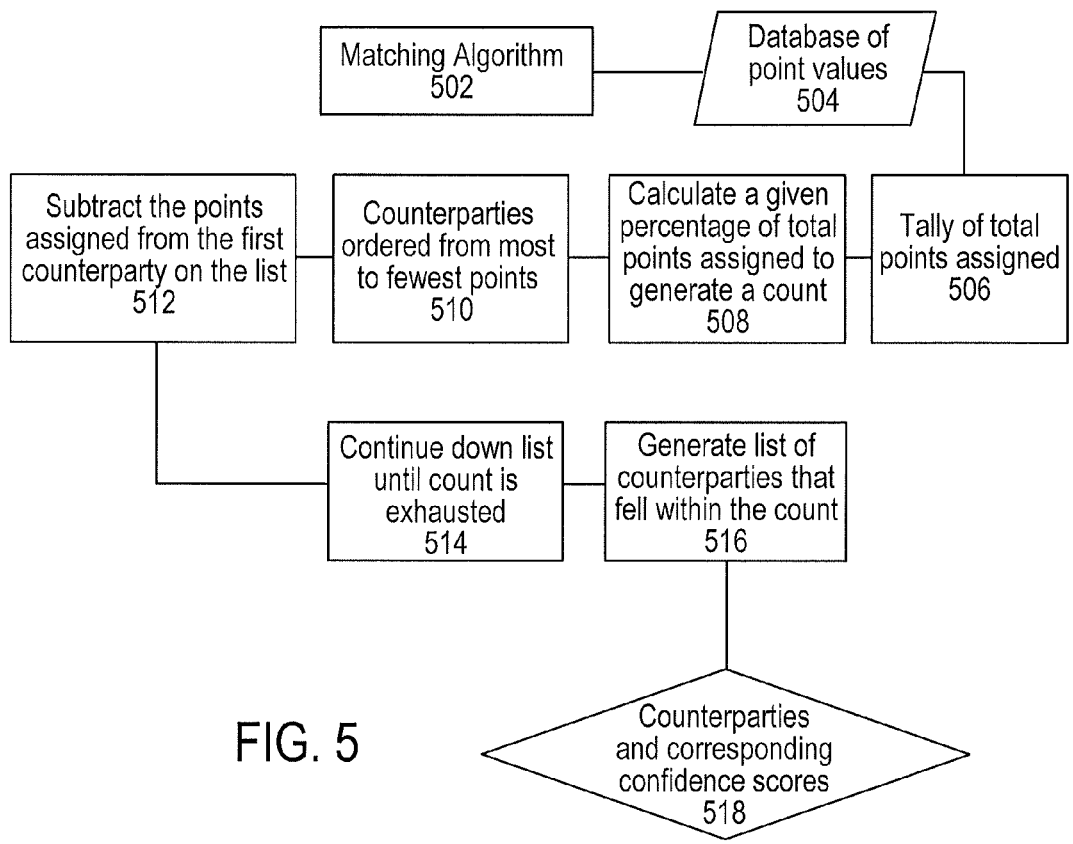
FIG. 5 is a flowchart of an exemplary method by which the computer-based platform in FIG. 2A generates a list of potential counterparties for a financial transaction.

FIG. 5 shows an exemplary process that may be implemented by the matching engine 364 in identifying potential counterparties and assigning confidence scores to the identified potential counterparties.

In general, when the Sales engine 362 calls the matching engine 364 to identify potential counterparties and to assign confidence scores to the identified potential counterparties, the matching engine implements a matching algorithm 502 that uses data in the platform's knowledge base to assign point values for each potential counterparty based on a consideration of various characteristics. Factors that can affect the assigned point values can include, for example, trade history of the potential counterparty, any current bids or offers listed by the potential counterparty for the security at issue, positions the potential counterparty holds in the security at issue, any better buyer/seller signals, and any signal positions in correlated securities. The matching algorithm 402 uses these (and potentially other) factors to calculate point values to be assigned to each potential counterparties.

In order to select the appropriate number of potential counterparties to contact, the algorithm 502 returns a database of point values 504. The platform then generates a tally (at 506) of the sum of all point values assigned by the matching algorithm 502. Some percentage of the total points assigned is then calculated (at 508) to be used as a count. This count is then applied to a list of all potential counterparties ordered (at 510) from most to fewest points. Starting from the first potential counterparty, the system subtracts (at 512) the points assigned to that counterparty from the overall count. The system continues down the list of potential counterparties, subtracting the assigned values for each party from the count until the count is exhausted (at 514). The system then generates the list of potential counterparties based on the counterparties that fell within the count and returns the selected counterparties and corresponding confidence scores (at 518).

Therefore, if very few of the potential counterparties have a majority of the points, the matching engine will return few potential counterparties. If, however, point scores are generally low and even, the matching engine will return more counterparties, which tends to compensate for a relative lack of available liquidity in the relevant market.

After calculating confidence scores (or point values) for each potential counterparty, the matching engine ranks all potential counterparties in order of decreasing scores, and returns the list of potential counterparties with corresponding confidence scores and the number of parties to contact at 518.

FIGS. 6A-6F show details of an exemplary method that can be implemented by the matching engine to assign points for a confidence score to a potential counterparty. In a typical implementation, the data needed to assess many, if not all, of the various characteristics discussed would be available in the platforms knowledge base.

Figure 6A:
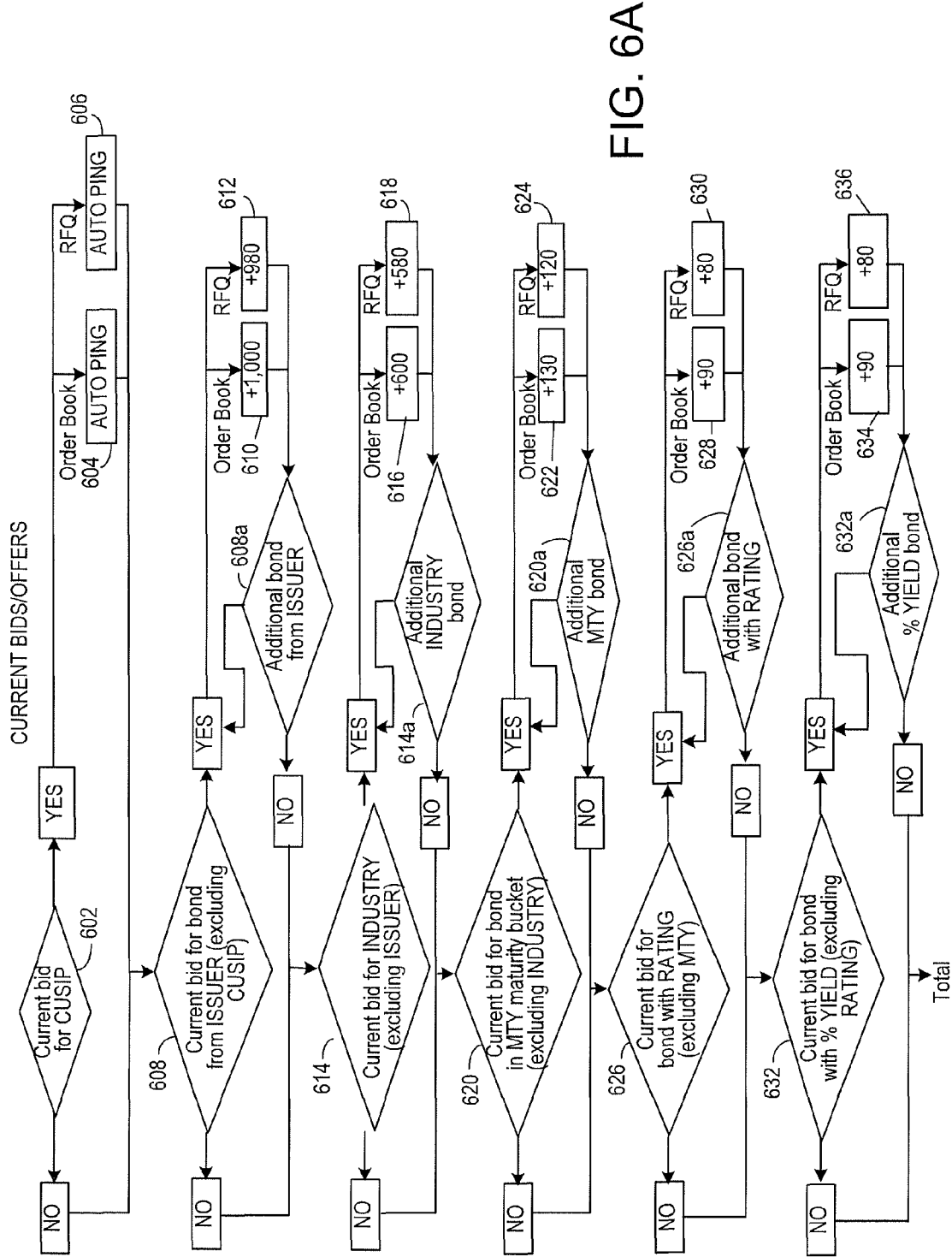
FIGS. 6A-6F include a flowchart of an exemplary method by which the computer-based platform in FIG. 2A determines the likelihood that a potential counterparty will be interested in a proposed financial transaction involving a transfer of a fixed income security.
Figure 6B:
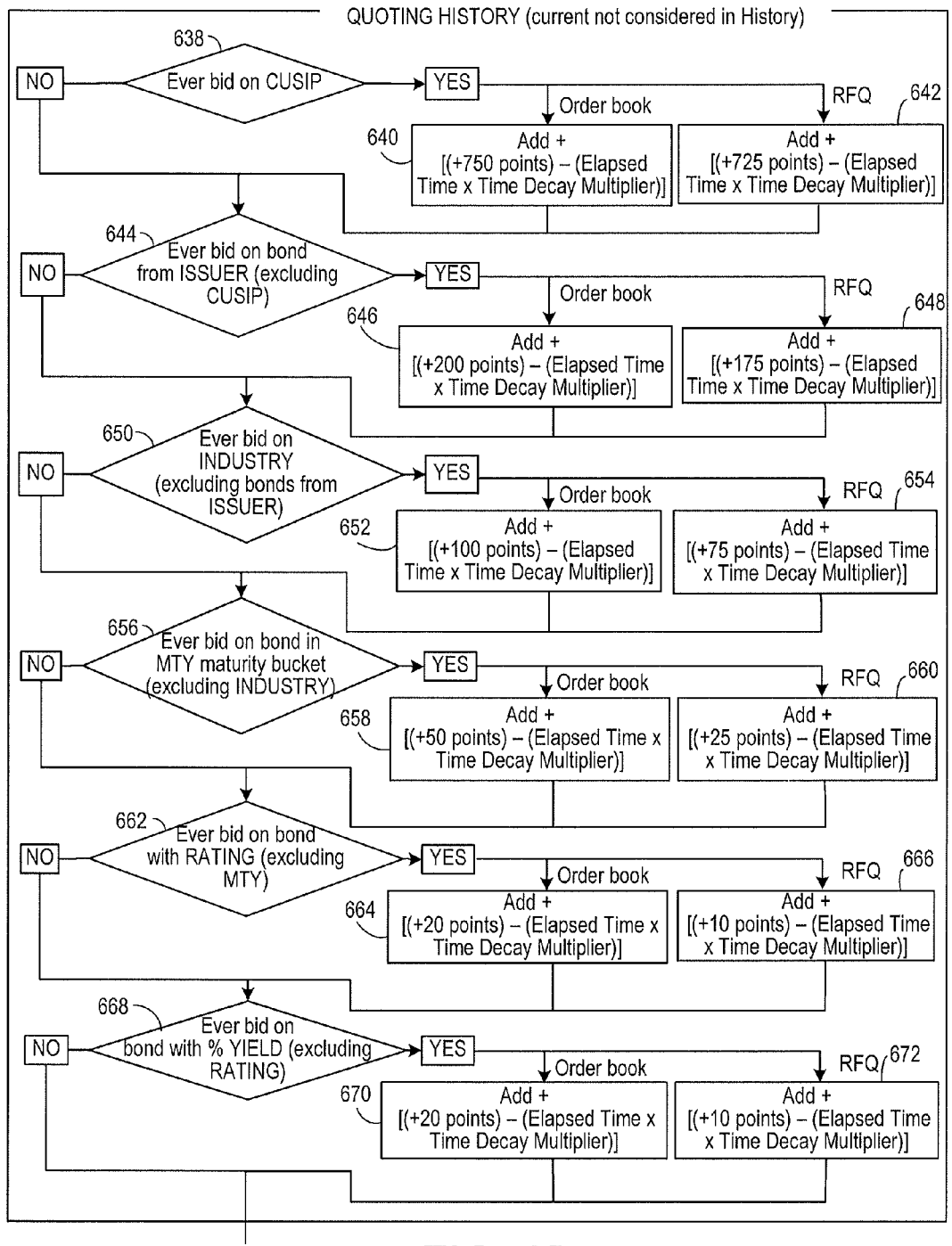
Figure 6C:
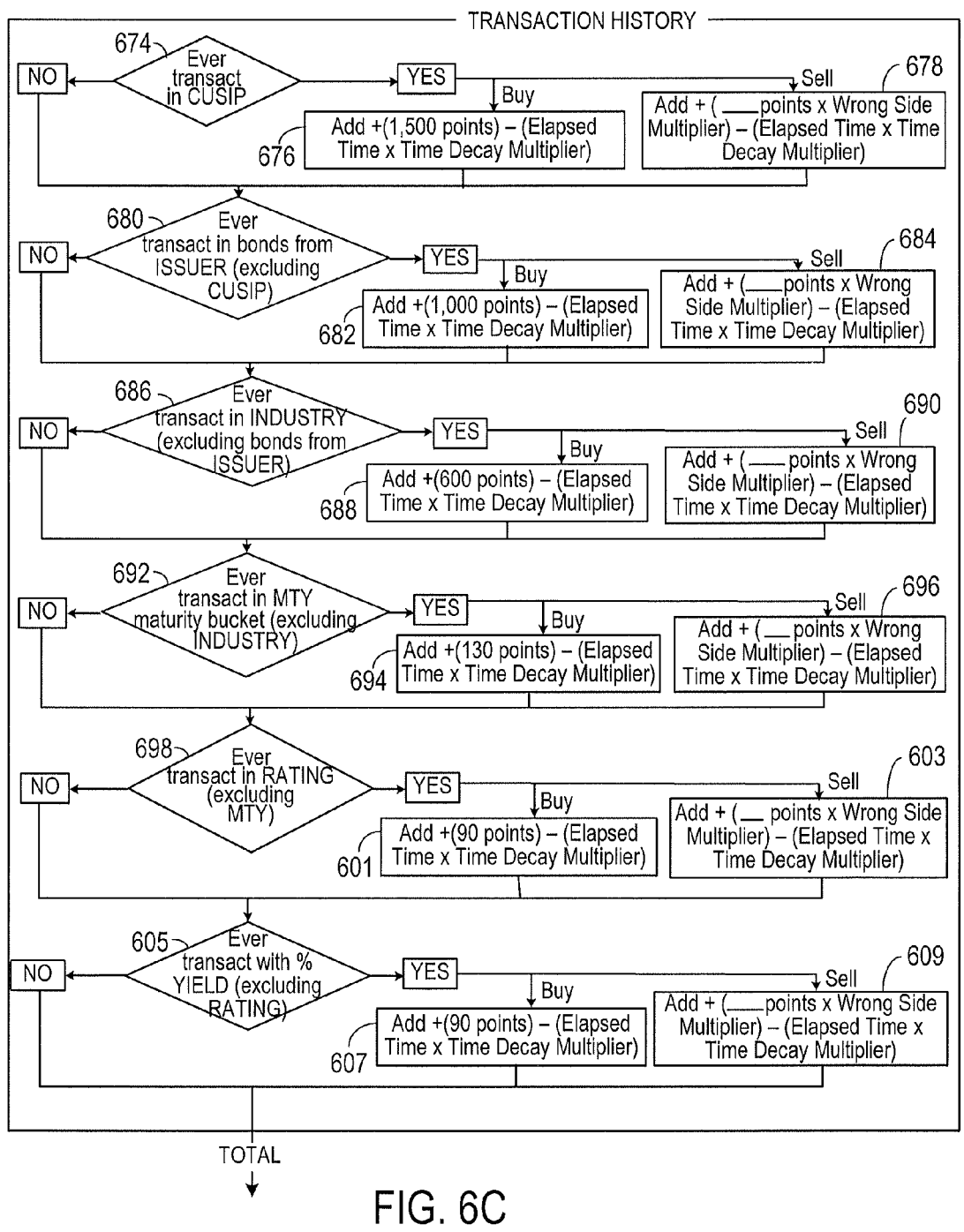
Figure 6D:
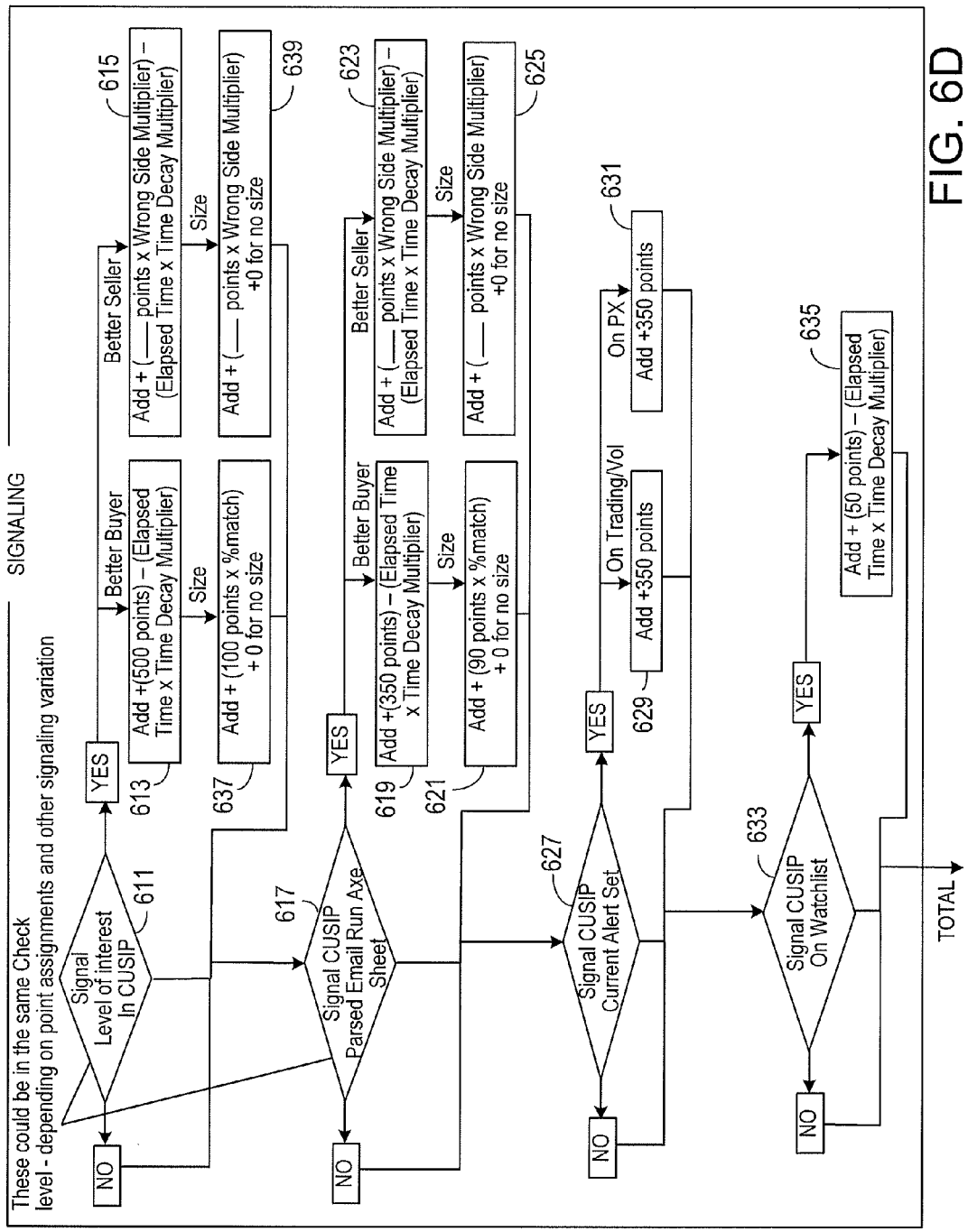
Figure 6E:
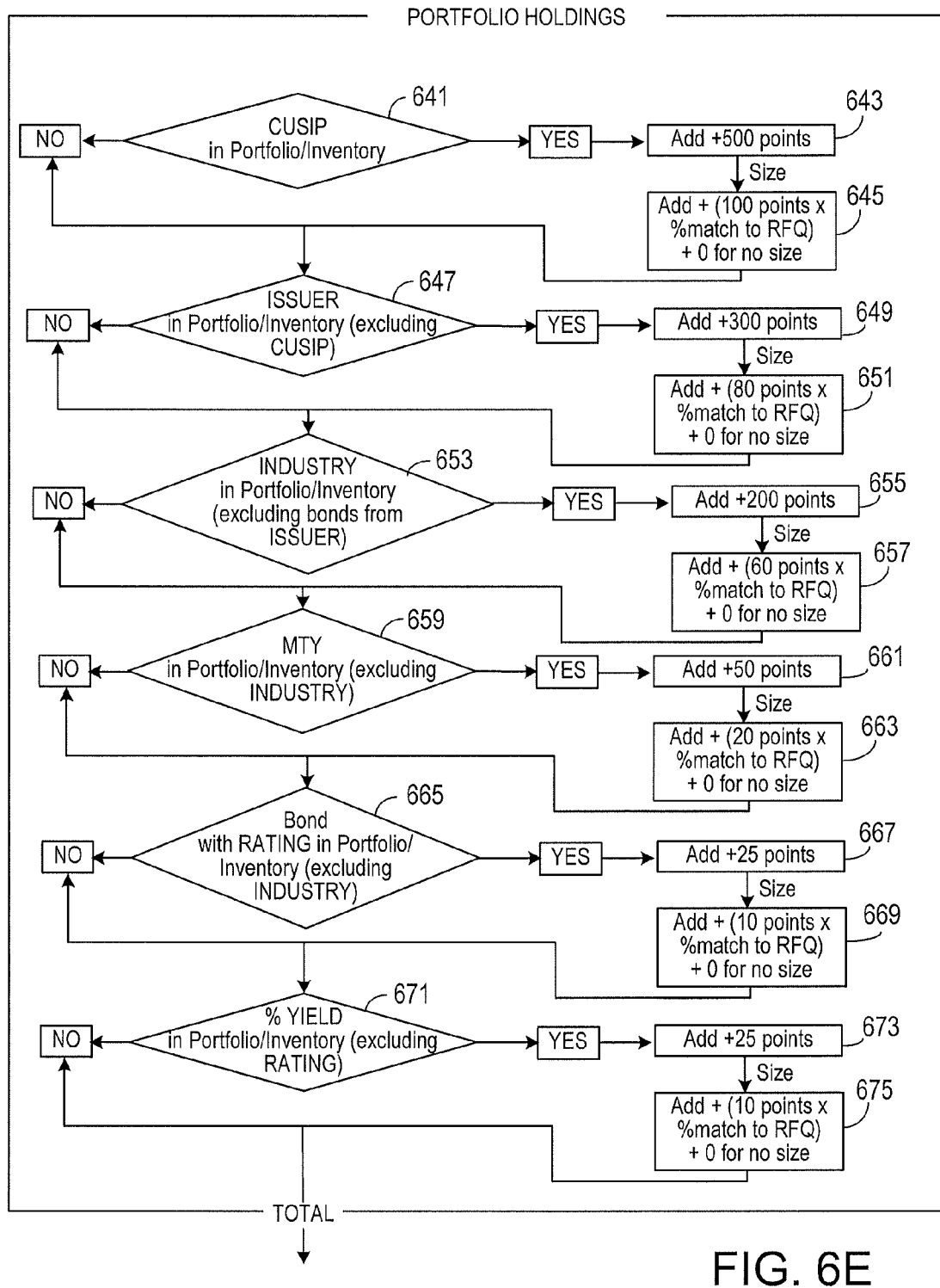
Figure 6F:
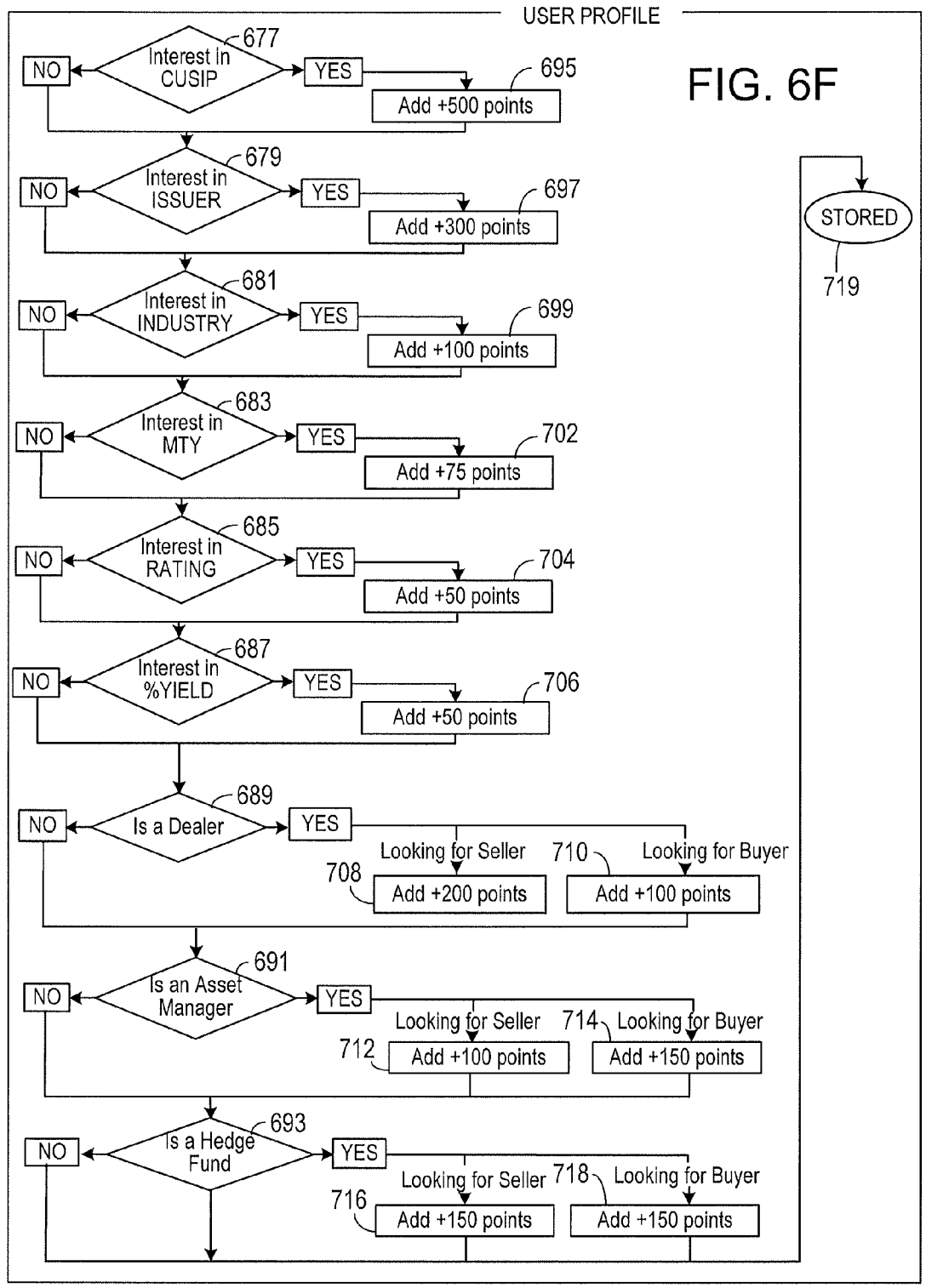

More particularly, the illustrated method includes consideration of the potential counterparty's current bids/offers (FIG. 6A), the potential counterparty's quoting history (FIG. 6B), the potential counterparty's transaction history (FIG. 6C), the potential counterparty's signaling (FIG. 6D), the potential counterparty's portfolio holdings (FIG. 6E) and information in the potential counterparty's virtual user's profile (FIG. 6F). In some implementations, one or more of these considerations may be omitted. Similarly, in some implementations, other considerations may be added (e.g., the time decay and/or wrong side multipliers).

In general, according to the illustrated implementation, the more confidence points that are assigned to a particular one of the potential counterparties, the more likely that particular one of the potential counterparties will be to complete the proposed financial transaction and, therefore, the more worthwhile that particular one of the potential counterparties will be to contact. In the illustrated implementation, the matching engine 364 maintains a running tally of confidence points assigned throughout the process represented in FIGS. 6A-6F.

Referring now to FIG. 6A, the matching engine considers, based on data in the platform's knowledge base, the potential counterparty's involvement in current bids or offers related to the fixed income security or securities that is or are the subject of the proposed financial transaction (referred to herein as the "fixed income security in question").

According to the illustrated implementation, the matching engine (at 602) determines, based on the data in the electronic database, to what degree the potential counterparty is involved in a current bid or offer for the fixed income security within the order book or has a current RFQ in the marketplace. If so, the matching engine "auto pings" (i.e., automatically sends the potential counterparty a request for quotation, at 604, 606). If not, the matching engine proceeds to the next step in the illustrated process.

Next, the matching engine (at 608) determines, based on the data in the electronic database, to what degree the potential counterparty is involved in a current bid for a different fixed income security with the same issuer as the fixed income security. If the potential counterparty has placed an order for a different fixed income security with the same issuer as the fixed income security in question, then, according to the illustrated embodiment, the matching engine (at 610) adds 1,000 points to the running tally of assigned confidence points. If the potential counterparty has a request for quotation outstanding for the different fixed income security with the same issuer as the fixed income security in question, then, according to the illustrated embodiment, the matching engine (at 612) adds 980 points to the running tally of assigned confidence points. The matching engine then proceeds to the next step in the illustrated process.

Next, the matching engine (at 614) determines, based on the data in the electronic database, to what degree the potential counterparty is involved in a current bid for a different fixed income security in the same industry as the fixed income security. If the potential counterparty has placed an order for a different fixed income security in the same industry as the fixed income security in question, then, according to the illustrated embodiment, the matching engine (at 616) adds 600 points to the running tally of assigned confidence points. If the potential counterparty has a request for quotation outstanding for a different fixed income security in the same industry as the fixed income security in question, then, according to the illustrated embodiment, the matching engine (at 618) adds 580 points to the running tally of assigned confidence points.

In general, with respect to historical transactions, a counterparty may have transacted more than one time in a bond, for example, fitting the criteria being checked. For example, a counterparty may have traded the CUSIP in question yesterday, last week and last year. To properly credit this user, in a typical implementation, it is assumed that every check point will be exhausted using all available and historic information. Thus, the various categories of considerations discussed herein should be circled around until all historic information on record has been accounted for. In general, time decay factors should be adapted to provide proper weighting to older transactions.

Moreover, as illustrated, several stages of the algorithm have loops implemented to ensure that all securities have been exhausted at the relevant levels (see, e.g., 608a, 614a, 620a, 626a and 632a).

The matching engine then proceeds to the next step in the illustrated process.

Next, the matching engine (at 620) determines, based on the data in the electronic database, to what degree the potential counterparty is involved in a current bid for a different fixed income security in the same maturity bracket as the fixed income security. If the potential counterparty has placed an order for a different fixed income security in the same maturity bracket as the fixed income security in question, then, according to the illustrated embodiment, the matching engine (at 622) adds 130 points to the running tally of assigned confidence points. If the potential counterparty has a request for quotation outstanding for a different fixed income security in the same industry as the fixed income security in question, then, according to the illustrated embodiment, the matching engine (at 624) adds 120 points to the running tally of assigned confidence points.

The matching engine then proceeds to the next step in the illustrated process.

Next, the matching engine (at 626) determines, based on the data in the electronic database, to what degree the potential counterparty is involved in a current bid for a different fixed income security with the same rating as the fixed income security. If the potential counterparty has placed an order for a different fixed income security with the same rating as the fixed income security in question, then, according to the illustrated embodiment, the matching engine (at 628) adds 90 points to the running tally of assigned confidence points. If the potential counterparty has a request for quotation outstanding for a different fixed income security with the same rating as the fixed income security in question, then, according to the illustrated embodiment, the matching engine (at 630) adds 80 points to the running tally of assigned confidence points.

The matching engine then proceeds to the next step in the illustrated process.

Next, the matching engine (at 632) determines, based on the data in the electronic database, to what degree the potential counterparty is involved in a current bid for a different fixed income security with the same yield percentage as the fixed income security in question. If the potential counterparty has placed an order for a different fixed income security with the same yield percentage as the fixed income security in question, then, according to the illustrated embodiment, the matching engine (at 634) adds 90 points to the running tally of assigned confidence points. If the potential counterparty has a request for quotation outstanding for a different fixed income security with the same yield percentage as the fixed income security in question, then, according to the illustrated embodiment, the matching engine (at 636) adds 80 points to the running tally of assigned confidence points.

The matching engine then proceeds to the next step in the illustrated process.

Referring now to FIG. 6B, the matching engine considers, based on data in the platform's knowledge base, the potential counterparty's quoting history as it relates to the fixed income security (or securities) that is the subject of the proposed financial transaction.

According to the illustrated implementation, the matching engine (at 638) determines, based on the data in the electronic database, to what degree the potential counterparty has ever been involved in a past bid or offer for the fixed income security. If the potential counterparty has placed a past order for the fixed income security in question, then, according to the illustrated embodiment, the matching engine (at 640) adds 750 points (minus a factor representing the elapsed time as modified by a time decay multiplier) to the running tally of assigned confidence points. If the potential counterparty has had a past request for quotation for the fixed income security in question, then, according to the illustrated embodiment, the matching engine (at 642) adds 725 points (minus a factor representing the elapsed time as modified by a time decay multiplier) to the running tally of assigned confidence points.

In some implementations, the factor representing the elapsed time may be the total number of seconds, minutes, hours and/or days elapsed and the time decay multiplier can be any number that represents the relative impact that the passage of time will have on the relevance of a particular type of past dealings.

The matching engine then proceeds to the next step in the illustrated process.

Next, the matching engine (at 644) determines, based on the data in the electronic database, to what degree the potential counterparty was involved in a past bid for a different fixed income security with the same issuer as the fixed income security. If the potential counterparty has placed a past order for a different fixed income security with the same issuer as the fixed income security in question, then, according to the illustrated embodiment, the matching engine (at 646) adds 200 points (minus a factor representing the elapsed time as modified by a time decay multiplier) to the running tally of assigned confidence points. If the potential counterparty has had a past request for quotation for a different fixed income security with the same issuer as the fixed income security the fixed income security in question, then, according to the illustrated embodiment, the matching engine (at 648) adds 175 points (minus a factor representing the elapsed time as modified by a time decay multiplier) to the running tally of assigned confidence points.

The matching engine then proceeds to the next step in the illustrated process.

Next, the matching engine (at 650) determines, based on the data in the electronic database, to what degree the potential counterparty was involved in a past bid for a different fixed income security in the same industry as the fixed income security. If the potential counterparty has placed a past order for a different fixed income security in the same industry as the fixed income security in question, then, according to the illustrated embodiment, the matching engine (at 652) adds 100 points (minus a factor representing the elapsed time as modified by a time decay multiplier) to the running tally of assigned confidence points. If the potential counterparty has had a past request for quotation for a different fixed income security in the same industry as the fixed income security in question, then, according to the illustrated embodiment, the matching engine (at 654) adds 75 points (minus a factor representing the elapsed time as modified by a time decay multiplier) to the running tally of assigned confidence points.

The matching engine then proceeds to the next step in the illustrated process.

Next, the matching engine (at 656) determines, based on the data in the electronic database, to what degree the potential counterparty was involved in a past bid for a different fixed income security in the same maturity bracket as the fixed income security. If the potential counterparty has placed a past order for a different fixed income security in the same maturity bracket as the fixed income security in question, then, according to the illustrated embodiment, the matching engine (at 658) adds 50 points (minus a factor representing the elapsed time as modified by a time decay multiplier) to the running tally of assigned confidence points. If the potential counterparty has had a past request for quotation for a different fixed income security in the same maturity bracket as the fixed income security in question, then, according to the illustrated embodiment, the matching engine (at 660) adds 25 points (minus a factor representing the elapsed time as modified by a time decay multiplier) to the running tally of assigned confidence points.

The matching engine then proceeds to the next step in the illustrated process.

Next, the matching engine (at 662) determines, based on the data in the electronic database, to what degree the potential counterparty was involved in a past bid for a different fixed income security with the same rating as the fixed income security. If the potential counterparty has placed a past order for a different fixed income security with the same rating as the fixed income security in question, then, according to the illustrated embodiment, the matching engine (at 664) adds 20 points (minus a factor representing the elapsed time as modified by a time decay multiplier) to the running tally of assigned confidence points. If the potential counterparty has had a past request for quotation for a different fixed income security with the same rating as the fixed income security in question, then, according to the illustrated embodiment, the matching engine (at 666) adds 10 points (minus a factor representing the elapsed time as modified by a time decay multiplier) to the running tally of assigned confidence points.

The matching engine then proceeds to the next step in the illustrated process.

Next, the matching engine (at 668) determines, based on the data in the electronic database, to what degree the potential counterparty was involved in a past bid for a different fixed income security with the same yield percentage as the fixed income security. If the potential counterparty has placed a past order for a different fixed income security with the same yield percentage as the fixed income security in question, then, according to the illustrated embodiment, the matching engine (at 670) adds 20 points (minus a factor representing the elapsed time as modified by a time decay multiplier) to the running tally of assigned confidence points. If the potential counterparty has had a past request for quotation for a different fixed income security with the same yield percentage as the fixed income security in question, then, according to the illustrated embodiment, the matching engine (at 672) adds 10 points (minus a factor representing the elapsed time as modified by a time decay multiplier) to the running tally of assigned confidence points.

The matching engine then proceeds to the next step in the illustrated process.

Referring now to FIG. 6C, the matching engine considers, based on data in the platform's knowledge base, the potential counterparty's transaction history for actual completed transactions as they relates to the fixed income security (or securities) that is the subject of the proposed financial transaction.

In general, with respect to historical transactions, a counterparty may have transacted more than one time in a bond, for example, fitting the criteria being checked. For example, a counterparty may have traded the CUSIP in question yesterday, last week and last year. To properly credit this user, in a typical implementation, it is assumed that every check point will be exhausted using all available and historic information. Thus, the various categories of considerations discussed herein should be circled around until all historic information on record has been accounted for. In general, the time decay factors should be adapted to provide proper weighting to older transactions.

According to the illustrated implementation, the matching engine (at 674) determines, based on the data in the electronic database, to what degree the potential counterparty has completed a transaction including the fixed income security. If the potential counterparty has bought the fixed income security in question, then, according to the illustrated embodiment, the matching engine (at 676) adds 1,500 points (minus a factor representing the elapsed time as modified by a time decay multiplier) to the running tally of assigned confidence points.

If the potential counterparty has sold the fixed income security in question, then, according to the illustrated embodiment, the matching engine (at 678) adds some different number of points (times a wrong side multiplier and minus a factor representing the elapsed time as modified by a time decay multiplier) to the running tally of assigned confidence points.

In a typical implementation, the wrong side multiplier is a number between zero and 1 and that adjusts the impact of the counterparty's involvement in the particular transaction in view of the fact that it was the seller when a buyer is sought.

Next, the matching engine (at 680) determines, based on the data in the electronic database, to what degree the potential counterparty has completed a transaction including a different fixed income security with the same issuer as the fixed income security. If the potential counterparty has bought a different fixed income security with the same issuer as the fixed income security in question, then, according to the illustrated embodiment, the matching engine (at 682) adds 1,000 points (minus a factor representing the elapsed time as modified by a time decay multiplier) to the running tally of assigned confidence points. If the potential counterparty has sold a different fixed income security with the same issuer as the fixed income security in question, then, according to the illustrated embodiment, the matching engine (at 684) adds some number of points (times a wrong side multiplier, minus a factor representing the elapsed time as modified by a time decay multiplier) to the running tally of assigned confidence points.

The matching engine then proceeds to the next step in the illustrated process.

Next, the matching engine (at 686) determines, based on the data in the electronic database, to what degree the potential counterparty has completed a transaction including a different fixed income security in the same industry as the fixed income security. If the potential counterparty has bought a different fixed income security in the same industry as the fixed income security in question, then, according to the illustrated embodiment, the matching engine (at 688) adds 600 points (minus a factor representing the elapsed time as modified by a time decay multiplier) to the running tally of assigned confidence points. If the potential counterparty has sold a different fixed income security in the same industry as the fixed income security in question, then, according to the illustrated embodiment, the matching engine (at 690) adds some number of points (times a wrong side multiplier, minus a factor representing the elapsed time as modified by a time decay multiplier) to the running tally of assigned confidence points.

The matching engine then proceeds to the next step in the illustrated process.

Next, the matching engine (at 692) determines, based on the data in the electronic database, to what degree the potential counterparty has completed a transaction including a different fixed income security in the same maturity bracket as the fixed income security. If the potential counterparty has bought a different fixed income security in the same maturity bracket as the fixed income security in question, then, according to the illustrated embodiment, the matching engine (at 694) adds 130 points (minus a factor representing the elapsed time as modified by a time decay multiplier) to the running tally of assigned confidence points. If the potential counterparty has sold a different fixed income security in the same maturity bracket as the fixed income security in question, then, according to the illustrated embodiment, the matching engine (at 696) adds some number of points (times a wrong side multiplier, minus a factor representing the elapsed time as modified by a time decay multiplier) to the running tally of assigned confidence points.

The matching engine then proceeds to the next step in the illustrated process.

Next, the matching engine (at 698) determines, based on the data in the electronic database, to what degree the potential counterparty has completed a transaction including a different fixed income security with the same rating as the fixed income security. If the potential counterparty has bought a different fixed income security with the same rating as the fixed income security in question, then, according to the illustrated embodiment, the matching engine (at 601) adds 90 points (minus a factor representing the elapsed time as modified by a time decay multiplier) to the running tally of assigned confidence points. If the potential counterparty has sold a different fixed income security with the same rating as the fixed income security in question, then, according to the illustrated embodiment, the matching engine (at 603) adds some number of points (times a wrong side multiplier, minus a factor representing the elapsed time as modified by a time decay multiplier) to the running tally of assigned confidence points.

The matching engine then proceeds to the next step in the illustrated process.

Next, the matching engine (at 605) determines, based on the data in the electronic database, to what degree the potential counterparty has completed a transaction including a different fixed income security with the same yield percentage as the fixed income security. If the potential counterparty has bought a different fixed income security with the same yield percentage as the fixed income security in question, then, according to the illustrated embodiment, the matching engine (at 607) adds 90 points (minus a factor representing the elapsed time as modified by a time decay multiplier) to the running tally of assigned confidence points. If the potential counterparty has sold a different fixed income security with the same yield percentage as the fixed income security in question, then, according to the illustrated embodiment, the matching engine (at 609) adds some number of points (times a wrong side multiplier, minus a factor representing the elapsed time as modified by a time decay multiplier) to the running tally of assigned confidence points.

The matching engine then proceeds to the next step in the illustrated process.

Referring now to FIG. 6D, the matching engine considers, based on data in the platform's knowledge base, the potential counterparty's signaling that may be relevant to the fixed income security (or securities) that is the subject of the proposed financial transaction.

The matching engine checks (at 611) to what degree the counterparty has indicated a level of interest in dealing with the fixed income security. If they have, then the system adds points to the running tally of assigned confidence points based on to what degree the party is a better buyer (in 613, 637) or seller (in 615 or 639) and the quantity they trade in. Any points assigned are adjusted by a wrong side multiplier, if the indication or tendency of the party is for the opposite side of the transaction.

The matching engine checks (at 617) for indications relevant to the fixed income security in dealer run emails and/or axe sheets. In some implementations, the emails and axe sheets are parsed by a different system, and the results are stored in the platform's knowledge base. The matching engine, in a typical implementation, treats these indications much like the "likes" of the previous loop. The system also checks different types of alerts (at 627) created by the counterparty, as well as watch lists (at 633) created by the counterparty. Appropriate points are added (at 619, 621, 623, 625, 629, 631 and 635) to the running tally of assigned confidence points as indicated. In various implementations, any one or more of these checks can be modified by a time decay multiplier.

In some implementations, the checks illustrated in FIG. 6d are repeated at different levels and with different point values for issuer, sector, rating, maturity, yield, and any other aspect of the security searched for.

Referring now to FIG. 6E, the matching engine considers, based on data in the platform's knowledge base, the potential counterparty's portfolio holdings as they relate to the fixed income security (or securities) that is the subject of the proposed financial transaction.

According to the illustrated implementation, the matching engine (at 641) determines, based on the data in the electronic database, to what degree the potential counterparty has the fixed income security in its portfolio holdings. If so, then, according to the illustrated embodiment, the matching engine (at 643) adds 500 points to the running tally of assigned confidence points. Moreover, depending on the size of the holdings, the matching engine (at 645) adds an additional 100 (times the size of the holdings as compared to the RFQ quantity, as a percentage).

The annotation "+o for no size" indicates that if there is no size held, then the loop adds zero. Similar marks exist in other iterations in the flowchart.

Next, the matching engine (at 647) determines, based on the data in the electronic database, to what degree the potential counterparty has a different fixed income security with the same issuer as the fixed income security in question in its portfolio holdings. If so, then, according to the illustrated embodiment, the matching engine (at 649) adds 300 points to the running tally of assigned confidence points. Moreover, depending on the size of the holdings, the matching engine (at 651) adds an additional 80 points (times the size of the holdings as compared to the RFQ quantity, as a percentage).

Next, the matching engine (at 653) determines, based on the data in the electronic database, to what degree the potential counterparty has a different fixed income security in the same industry as the fixed income security in question. If so, then, according to the illustrated embodiment, the matching engine (at 655) adds 200 points to the running tally of assigned confidence points. Moreover, depending on the size of the holdings, the matching engine (at 657) adds an additional 60 points (times the size of the holdings as compared to the RFQ quantity, as a percentage).

Next, the matching engine (at 653) determines, based on the data in the electronic database, to what degree the potential counterparty has a different fixed income security in the same industry as the fixed income security in question. If so, then, according to the illustrated embodiment, the matching engine (at 655) adds 200 points to the running tally of assigned confidence points. Moreover, depending on the size of the holdings, the matching engine (at 657) adds an additional 60 points (times the size of the holdings as compared to the RFQ quantity, as a percentage).

Next, the matching engine (at 659) determines, based on the data in the electronic database, to what degree the potential counterparty has a different fixed income security in the same maturity bracket as the fixed income security in question. If so, then, according to the illustrated embodiment, the matching engine (at 661) adds 50 points to the running tally of assigned confidence points. Moreover, depending on the size of the holdings, the matching engine (at 663) adds an additional 20 points (times the size of the holdings as compared to the RFQ quantity, as a percentage).

Next, the matching engine (at 665) determines, based on the data in the electronic database, to what degree the potential counterparty has a different fixed income security with the same rating as the fixed income security in question. If so, then, according to the illustrated embodiment, the matching engine (at 667) adds 25 points to the running tally of assigned confidence points. Moreover, depending on the size of the holdings, the matching engine (at 669) adds an additional 10 points (times the size of the holdings as compared to the RFQ quantity, as a percentage).

Next, the matching engine (at 671) determines, based on the data in the electronic database, to what degree the potential counterparty has a different fixed income security with the same percent yield as the fixed income security in question. If so, then, according to the illustrated embodiment, the matching engine (at 673) adds 25 points to the running tally of assigned confidence points. Moreover, depending on the size of the holdings, the matching engine (at 675) adds an additional 10 points (times the size of the holdings as compared to the RFQ quantity, as a percentage).

Referring now to FIG. 6F, the matching engine considers to what degree a virtual profile set up by the potential counterparty reflects an interest in the CUSIP (at 677), an interest in the issuer (at 679), an interest in the industry (at 681), an interest in the maturity bracket (at 683), an interest in the rating (at 685) and an interest in the percent yield (at 687). For each positive indication, the matching engine adds (at 695, 697, 699, 702, 704 and 706) a corresponding number of points to the running tally of assigned confidence points.

The matching engine also considers to what degree the potential counterparty is a dealer (at 689), an asset manager (at 691) or a hedge fund (at 693). If so, the matching engine considers to what degree the potential counterparty is looking for a seller or looking for a buyer and adds (at 708, 710, 712, 714, 716 and 718) a corresponding number of points to the running tally of assigned confidence points.

In a typical implementation, the running tally (and final tally) of assigned confidence points for each of the potential counterparties considered, is stored 719 in the electronic database.

FIGS. 7A-7F are schematic representations of the various specific interactions.

Figure 7A:
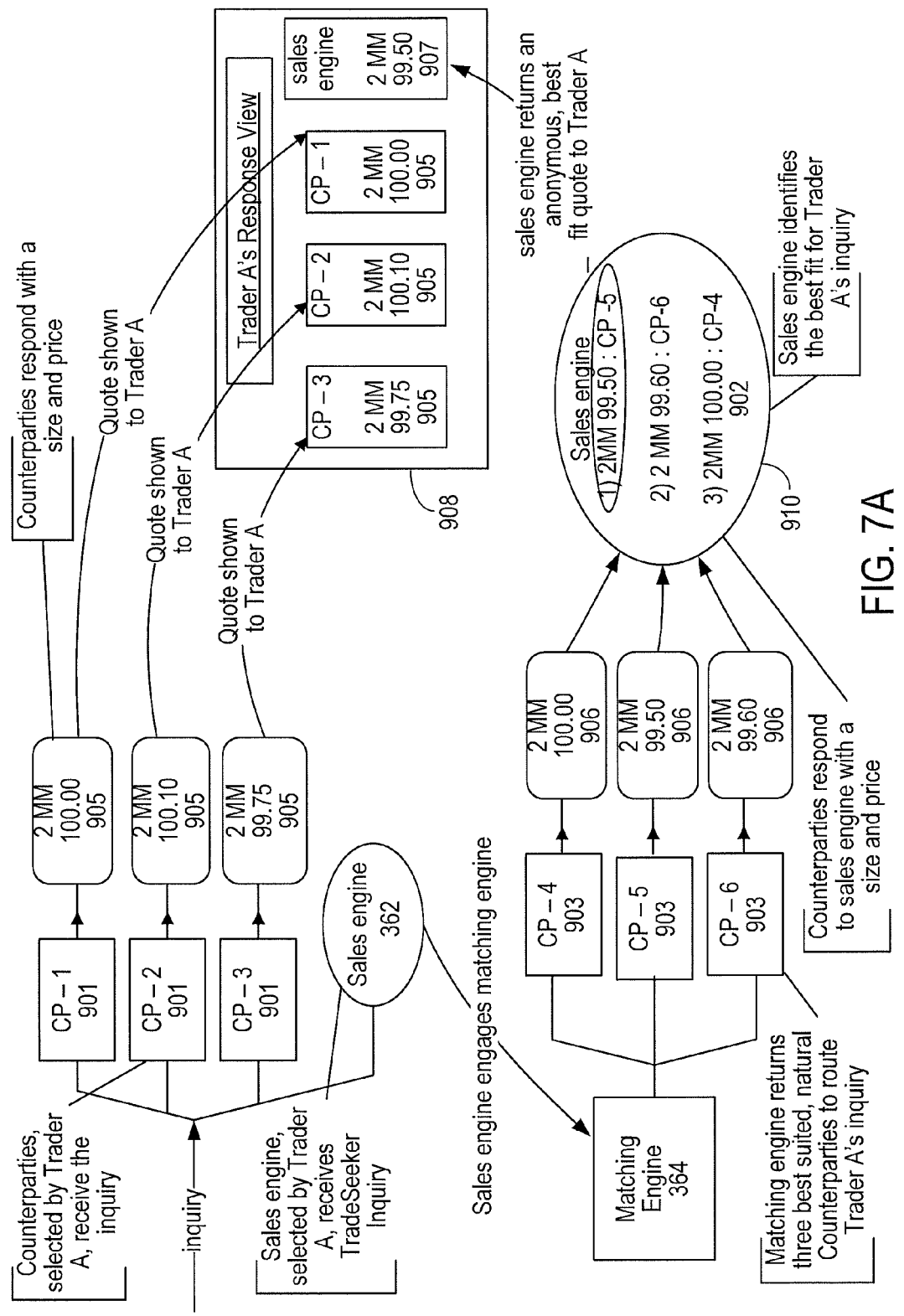
FIGS. 7A-7G are schematic representations of the computer-based platform of FIG. 2A facilitating a financial transaction involving a fixed income security.

Referring now to FIG. 7A, the platform 220 sends an RFQ to three potential counterparties 901 (CP-1, CP-2, CP-3) that have been identified by an initiating party ("Trader A"). In the illustrated implementation, the RFQ is for 2 million units of a particular fixed income security. The sales engine 362 also receives an indication that quotations are desired.

According to the illustrated implementation, all three potential counterparties identified by the initiating party respond to the RFQ with offers that include a size and price. For example, potential counterparty CP-1 responds with an offer to buy 2 million units at $100.00 per unit, potential counterparty CP-2 responds with an offer to buy 2 million units at $100.10 per unit and potential counterparty CP-3 responds with an offer to buy 2 million units at $99.75 per unit.

In the illustrated implementation, the platform 220 makes each of the three offers returned by initiating party-selected potential counterparties (CP-1, CP-2, CP-3) available for viewing at a visual display 908 of a computer terminal that is accessible by the initiating party.

The sales engine 362, in response to receiving the indication that quotations are desired, engages the matching engine 364 to find one or more potential counterparties that are likely, based on information in the platform's knowledge base, to be interested in responding to the RFQ (and completing the proposed financial transaction associated with the RFQ).

The matching engine 364 returns three potential counterparties 903 (CP-4, CP-5, CP-6) and the platform 220 sends the RFQ to the three matching engine-identified, potential counterparties (CP-4, CP-5, CP-6).

According to the illustrated implementation, all three of the matching-engine-identified, potential counterparties (CP-4, CP-5, and CP-6) respond to the RFQ with an offer specifying size and price. For example, potential counterparty CP-4 responds with an offer to buy 2 million units at $100.00 per unit, potential counterparty CP-5 responds with an offer to buy 2 million units at $99.50 per unit and potential counterparty CP-6 responds with an offer to buy 2 million units at $99.60 per unit.

The sales engine (at 910) receives all three offers from the matching engine-identified potential counterparties. The sales engine ranks the offers from best to worst and identifies the best of the offers, which in the illustrated example is the offer of 2 million units at $99.50 received from potential counterparty CP-5.

According to the illustrated implementation, the platform 220 makes the best of the three offers returned by the matching-engine-identified potential counterparties (in this case CP-5's offer) available for viewing at a visual display 908 of a computer terminal that is accessible by the initiating party. In a typical implementation, this is done anonymously, that is without revealing to the initiating party the responding counterparty's identity.

Figure 7B:
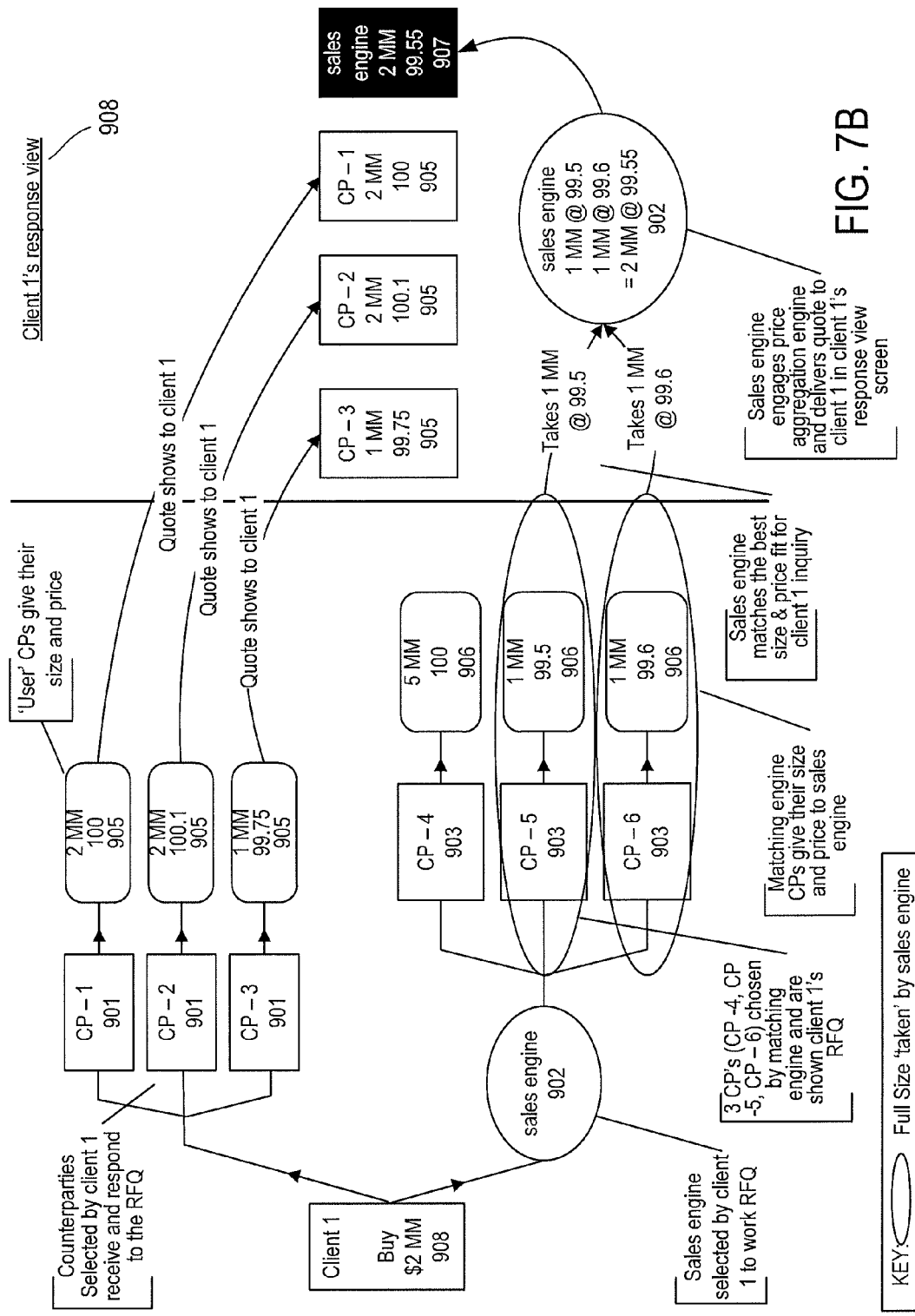

FIG. 7B is similar to FIG. 7A, in that the three potential counterparties 901 selected by the initiating party and the three matching engine-selected potential counterparties 903 are sent RFQs. Moreover, all of those parties respond with quotes 905, 906 which contain both size and price. However, in the example of FIG. 7B, the initiating party ("client 1") has requested to buy 2 million units at 908 and each of the counterparty offers with the best prices (i.e., the offer from CP-5 for 1 million units at $99.50 and the offer from CP-6 for 1 million at $99.60) is too small to satisfy the requirements of the initiating party ("client 1").

Therefore, in the illustrated implementation, the sales engine, recognizing that neither one of the best offers received from the matching engine-selected potential counterparties would satisfy the initiating party's requirements on its own, uses the price aggregation engine to combine the two best offers into a single offer having a price that is a weighted average of the two best prices. In the illustrated example, the two best offers (i.e., the offer from CP-5 for 1 million units at $99.50 and the offer from CP-6 for 1 million at $99.60) are combined into a single offer for 2 million units at $99.55 that is made available for viewing to the initiating party.

In the illustrated example, the single offer that represents the two best offers from matching engine-selected potential counterparties is the best of all of the offers presented to the initiating party.

Figure 7C:
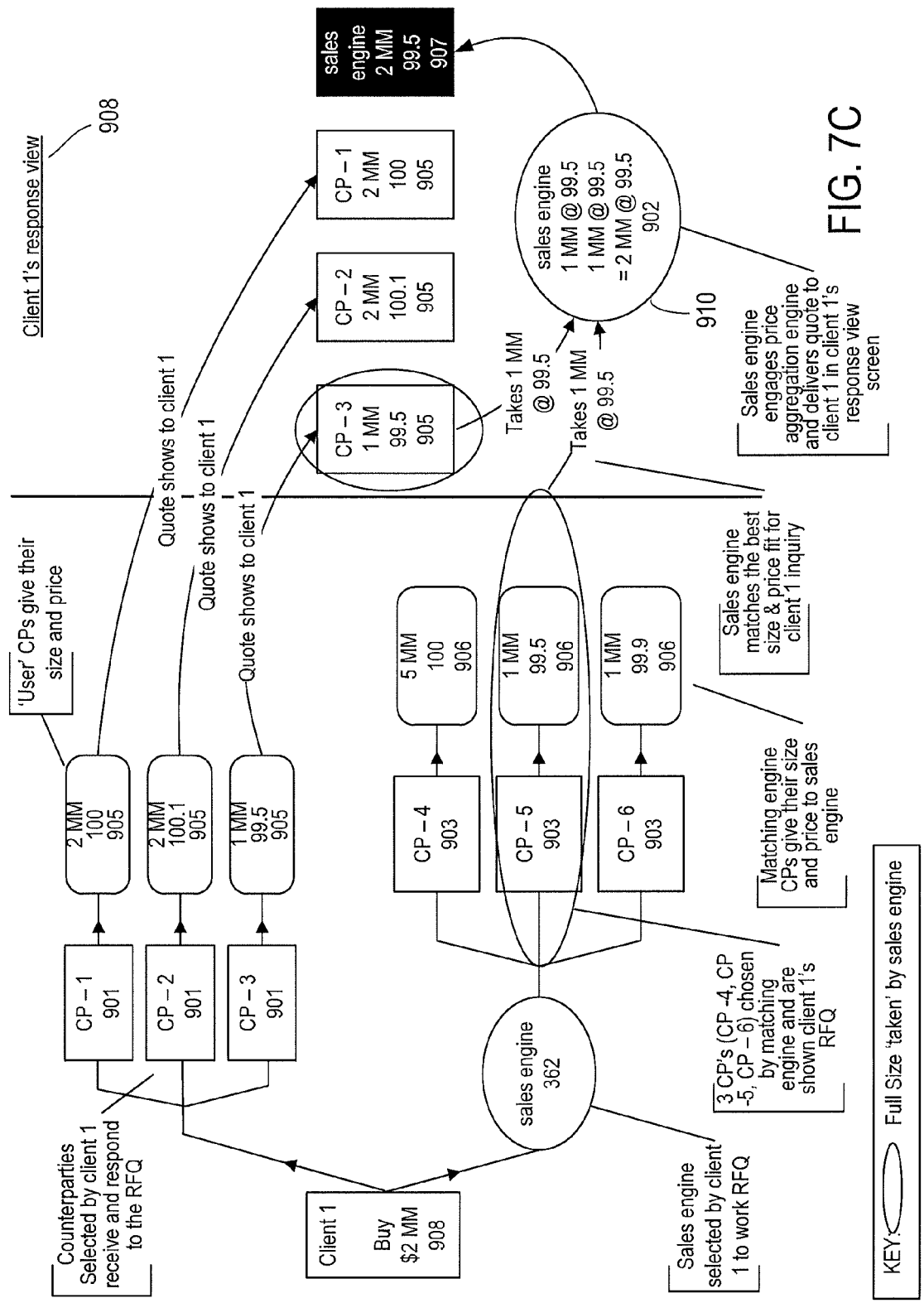

FIG. 7C is similar to FIG. 7b, except that the best price in the offers received appears in an offer from one of the potential counterparties (CP-3) selected by the initiating party and in an offer received from one of the potential counterparties (CP-5) selected by the matching engine. Each of those offers is for 1 million units at $99.50 per unit.

In FIG. 7C, the initiating party's request is for 2 million units. Therefore, each of the offers with the best price is too small on its own to satisfy the 2 million unit requirement. Accordingly, in the illustrated implementation, the aggregation engine combines the two offers having the best price (i.e., the offer for 1 million units at $99.50 from CP-3 and the offer for 1 million units at $99.50 from CP-5) into a single offer for 2 million units at $99.50 that is made available for viewing to the initiating party. The sales engine 902, in this example, applies the aggregation engine over all available quotes and returns the best possible single aggregated quote 907 for the user requested volume.

In a typical implementation, this is reported alongside all quotes returned by the initiating party-selected counterparties including the quote included in the aggregated result.

Figure 7D:
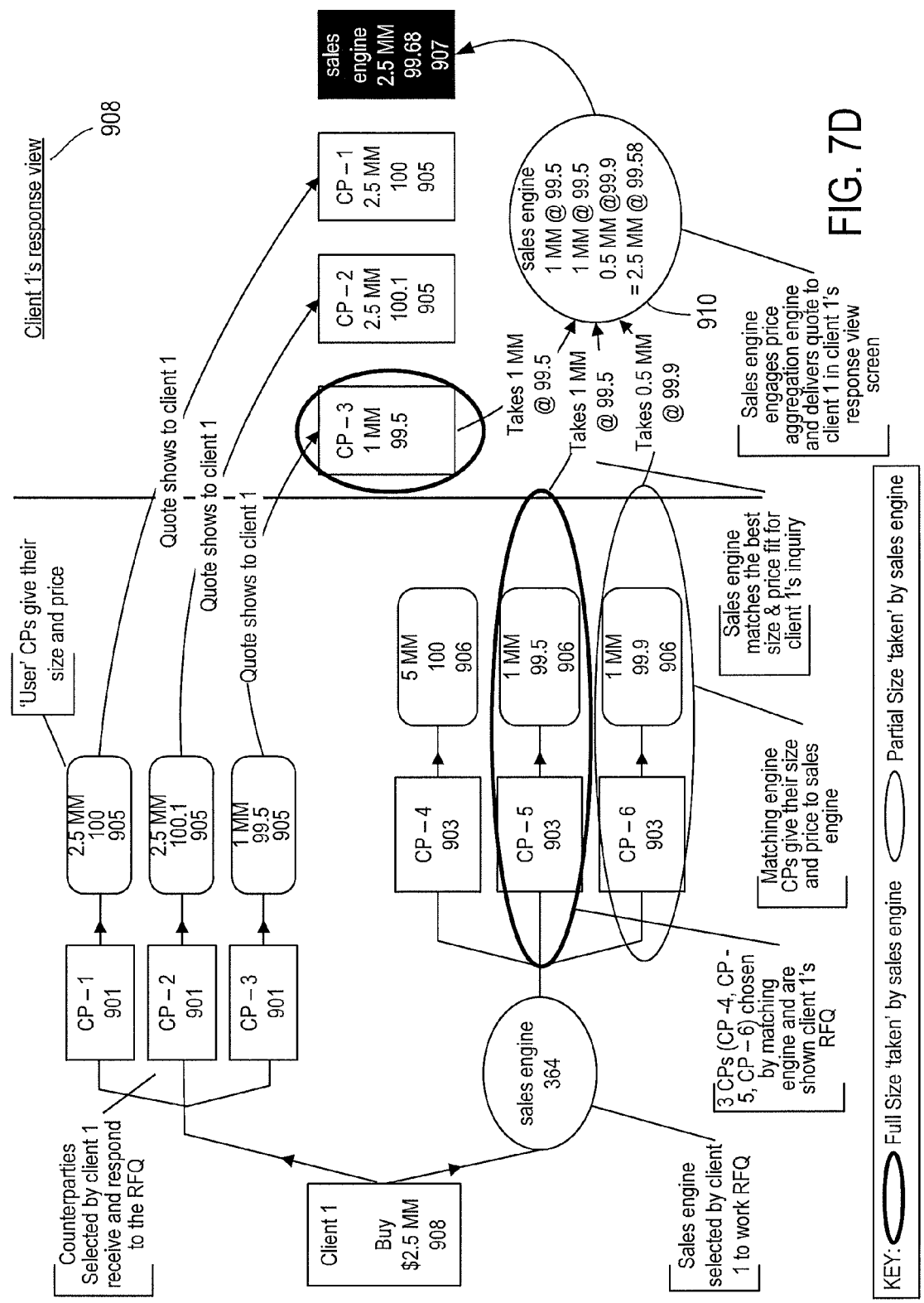

FIG. 7D is similar to FIG. 7C except that the aggregation engine in FIG. 7D combines offers from three different potential counterparties to satisfy the initiating party's requirements. This includes a partial fill from one of the counterparties.

Figure 7E:
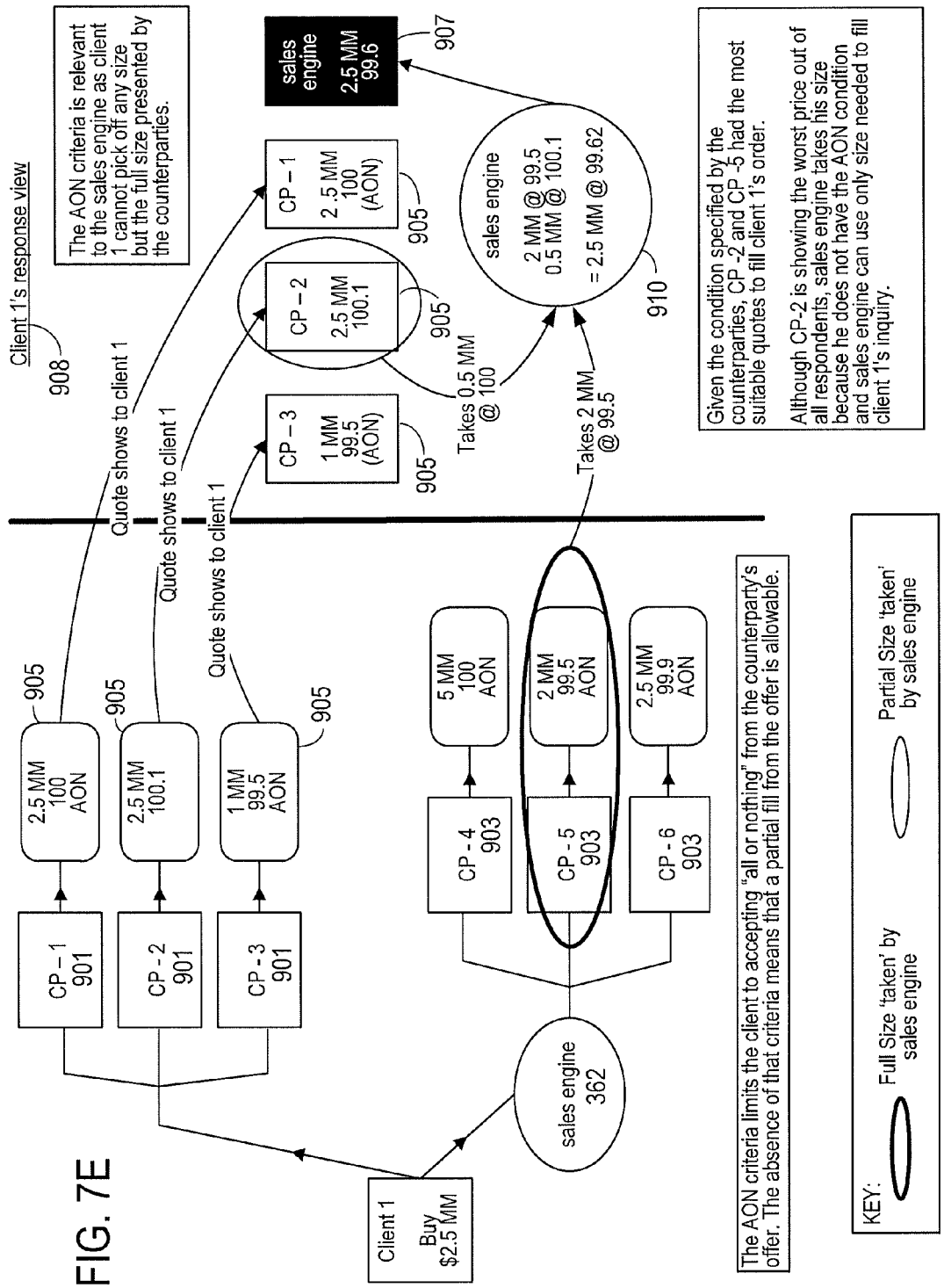

FIG. 7E is similar to FIG. 7D except that, in FIG. 7E, several of the best prices are limited by an all-or-nothing (AON) restraint. In the illustrated implementation, the aggregation engine factors this restraint into its best price, and returns the best possible aggregated price to the trader. This price includes the worst available price for a limited portion of the order, because it is the only price available without the all-or-nothing constraint. When combined with the best available price, the aggregated price remains better than any other available price for the requested volume.

Figure 7F:
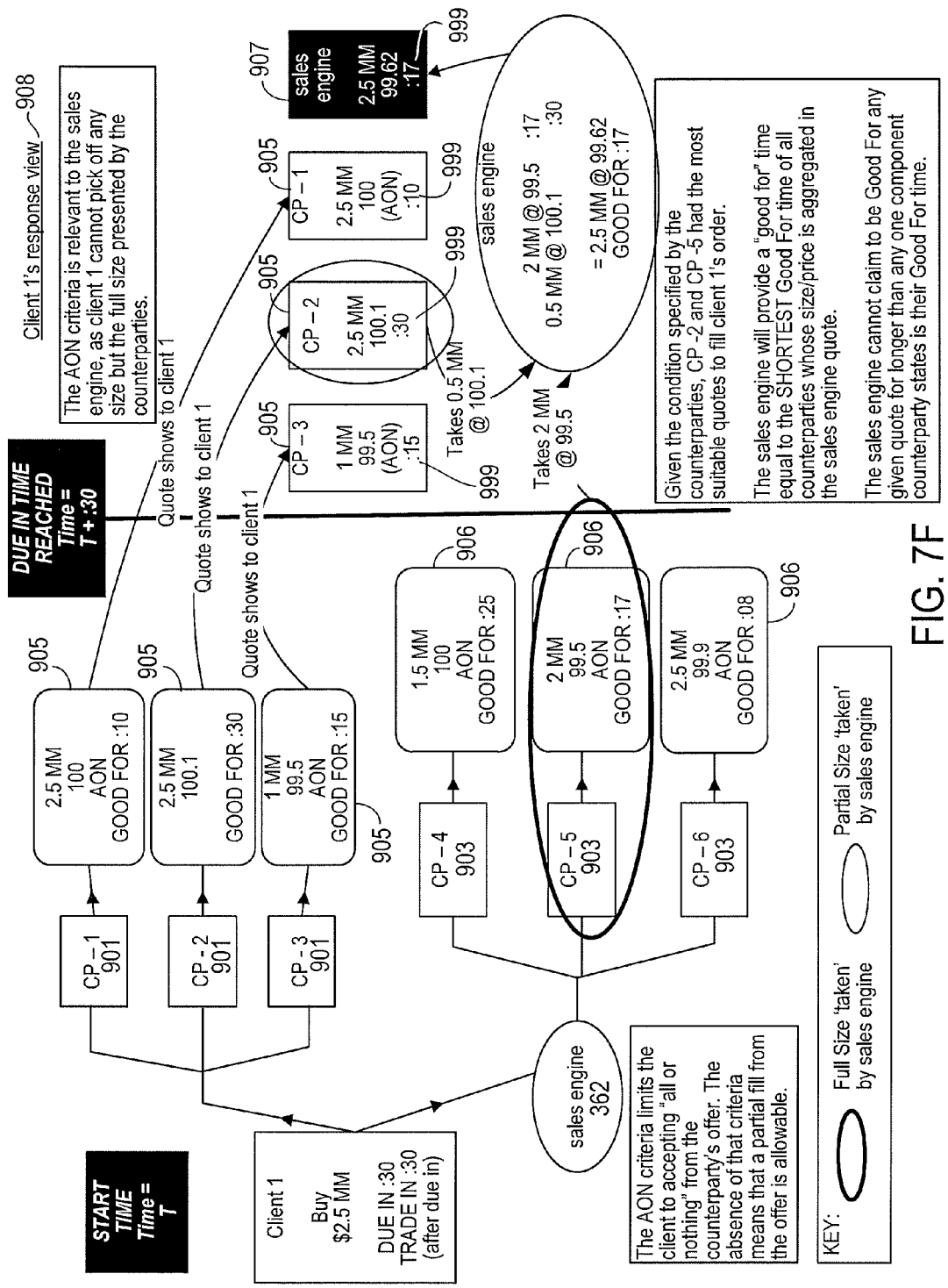
Figure 7G:
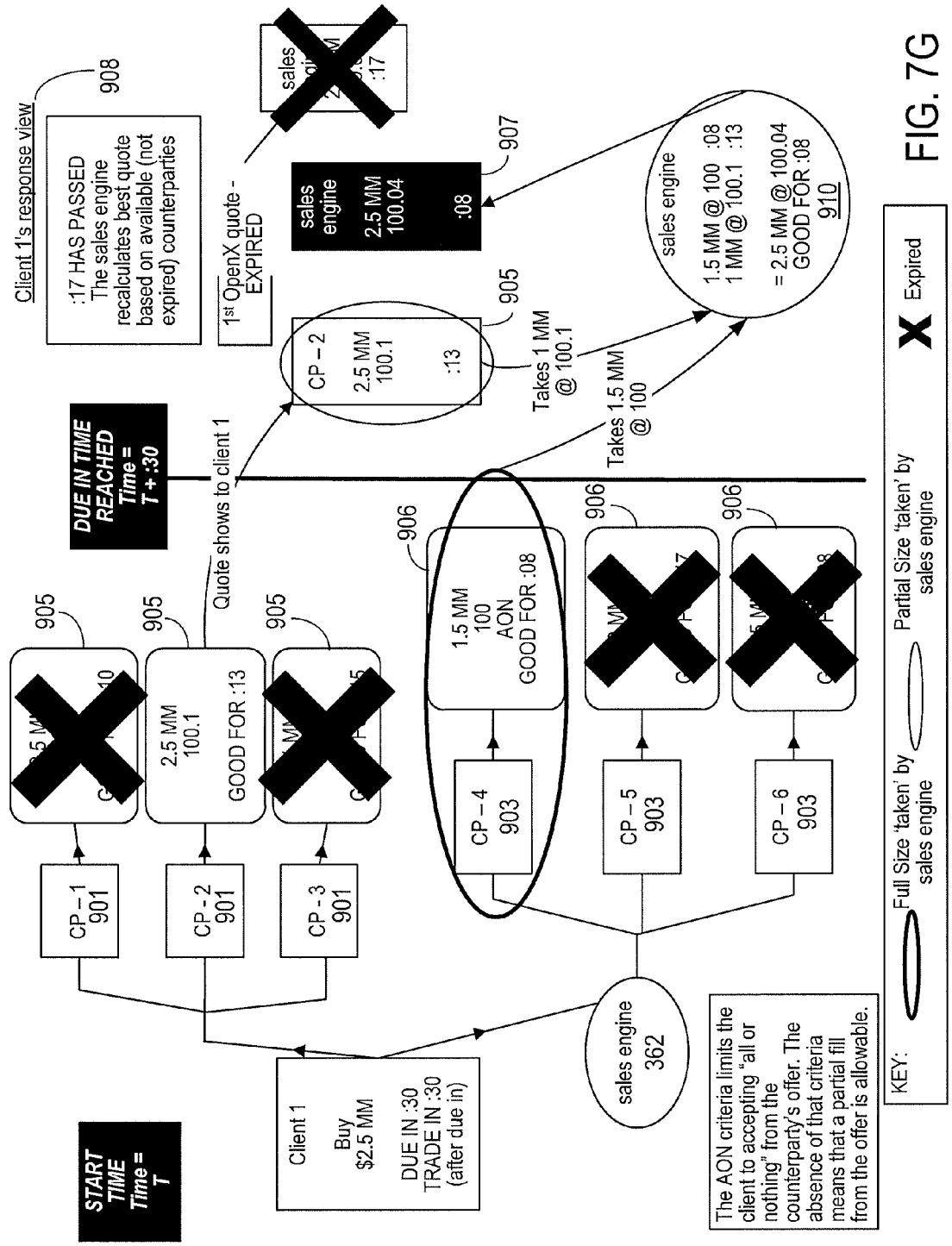

FIGS. 7F and 7G combine to show the results of time based restraints. When the sales engine receives quotes with attached time restraints, the aggregation engine returns the best available price for the requested quantity along with a timer counting down how long that price is good for. If the user does not select the quote within the time frame the quote is available for, the aggregation engine calculates a new best available quote based on remaining available quotes and presents the new best available quote to the initiating party for acceptance.

In FIG. 7F, for example, the platform 220 sends an RFQ to three potential counterparties 901 (CP-1, CP-2, CP-3) that have been identified by an initiating party ("Client 1"). In the illustrated implementation, the RFQ is for 2.5 million units of a particular fixed income security. The sales engine 362 also receives an indication that quotations are desired.

According to the illustrated implementation, all three potential counterparties identified by the initiating party respond to the RFQ with offers that include a size and price. Each of these offers has an associated duration, beyond which the offer will expire. For example, potential counterparty CP-1 responds with an all-or-nothing offer to sell 2.5 million units at $100.00 per unit that will expire in 10 seconds, potential counterparty CP-2 responds with an offer to sell 2.5 million units at $100.10 per unit that will expire in 30 seconds and potential counterparty CP-3 responds with an all-or-nothing offer to sell 1 million units at $99.50 per unit that will expire in 15 seconds. The durations are indicated by the respective potential counterparties.

In the illustrated implementation, the platform 220 makes information associated with each of the three offers returned by initiating party-selected potential counterparties (CP-1, CP-2, CP-3) available for viewing at a visual display 908 of a computer terminal that is accessible by the initiating party. In particular, the information made available in connection with these offers includes the responding potential counterparties' identity, the offer size and price, as well as any other relevant details (e.g., if the offer specifies all-or-nothing). Also made available is the duration (or remaining duration, represented by a countdown-to-expiration clock, at 999) associated with each offer.

The sales engine 362, in response to receiving the indication that quotations are desired, engages the matching engine to find one or more potential counterparties that are likely, based on information in the platform's knowledge base, to be interested in responding to the RFQ (and completing the proposed financial transaction associated with the RFQ).

The matching engine returns three potential counterparties 903 (CP-4, CP-5, CP-6) and the platform 220 sends the RFQ to the three potential counterparties identified by the matching engine (CP-4, CP-5, CP-6).

According to the illustrated implementation, all three of the matching-engine-identified potential counterparties (CP-4, CP-5, and CP-6) respond to the RFQ with an offer specifying size, price and duration. For example, potential counterparty CP-4 responds with an all-or-nothing offer to sell 1.5 million units at $100.00 per unit that expires in 25 seconds, potential counterparty CP-5 responds with an all-or-nothing offer to sell 2 million units at $99.50 per unit that expires in 17 seconds and potential counterparty CP-6 responds with an all-or-nothing offer to sell 2 million units at $99.60 per unit that expires in 8 seconds.

The sales engine (at 910) identifies, from among all of the offers received, the best combination of offers that would satisfy all of the requirements of the RFQ. In the illustrated embodiment, the sales engine combines part of the offer from potential counterparty CP-2 with the full offer from potential counterparty CP-5 as indicated. More particularly, the sales engine combines 0.5 million units from the 2.5 million at $100.10 per unit offer from CP-2 with the entire 2 million unit all-or-nothing offer at $99.50 from CP-5. This represents the best combination of offers from a cost perspective for the initiating party.

In the illustrated implementation, this combined offer of 2.5 million units at a weighted average price of $99.62 per unit is made available for viewing to the initiating party in addition to the three offers from the potential counterparties (CP-1, CP-2, CP-3) identified by the initiating party.

Since the offer from CP-2 has a duration of 30 seconds and the offer from CP-5 has a duration of 17 seconds, the duration of the combined offer (based on CP-2's offer and CP-5's offer) is 17 seconds (i.e., the lower duration of the offers combined). In the illustrated implementation, the sales engine makes this 17 second duration available to the initiating party for viewing (see 999) in association with the combined offer details.

After the duration of 17 seconds (in FIG. 7F) expires, the combined offer disappears. In some implementations, this is replaced by a new offer that is calculated based on the best of the remaining (i.e., not expired) offers.

FIG. 7G represents the scenario of FIG. 7F after 17 seconds has expired. As illustrated, the offers from potential counterparties CP-1, CP-3, CP-5 and CP-6, having durations of 10 seconds, 15 seconds, 17 seconds and 8 seconds, respectively, are all expired (as indicated by the "Xs"). Also expired is the original combined offer (from CP-2 and CP-5), which, as discussed above, had a duration of 17 seconds.

In response to the original combined offer expiring, the sales engine recalculates a new combination of offers that collectively provide to the initiating party the best price available for the requested quantity based on the offers that have not yet expired. In the illustrated example, the new best offer is 2.5 million units at $100.04 per unit with a duration of 8 seconds. This is based on combining 1 million units from CP-2's 2.5 million unit offer at $100.10 per unit and having a duration of 13 seconds with the 1.5 million unit all-or-nothing offer from CP-4 for 1.5 million units for $100.00 per unit having a duration of 8 seconds.

The best new combined offer is made available for viewing to the initiating party.

In a typical implementation, the best combined offer presented to initiating party can continue to change as the contributors to the previous best combined offers expire and as long as unexpired offers remain.

FIGS. 8A-8F are exemplary screenshots that an initiating party may see when accessing certain aspects of the platform's functionality as discussed herein.

Figure 8A:
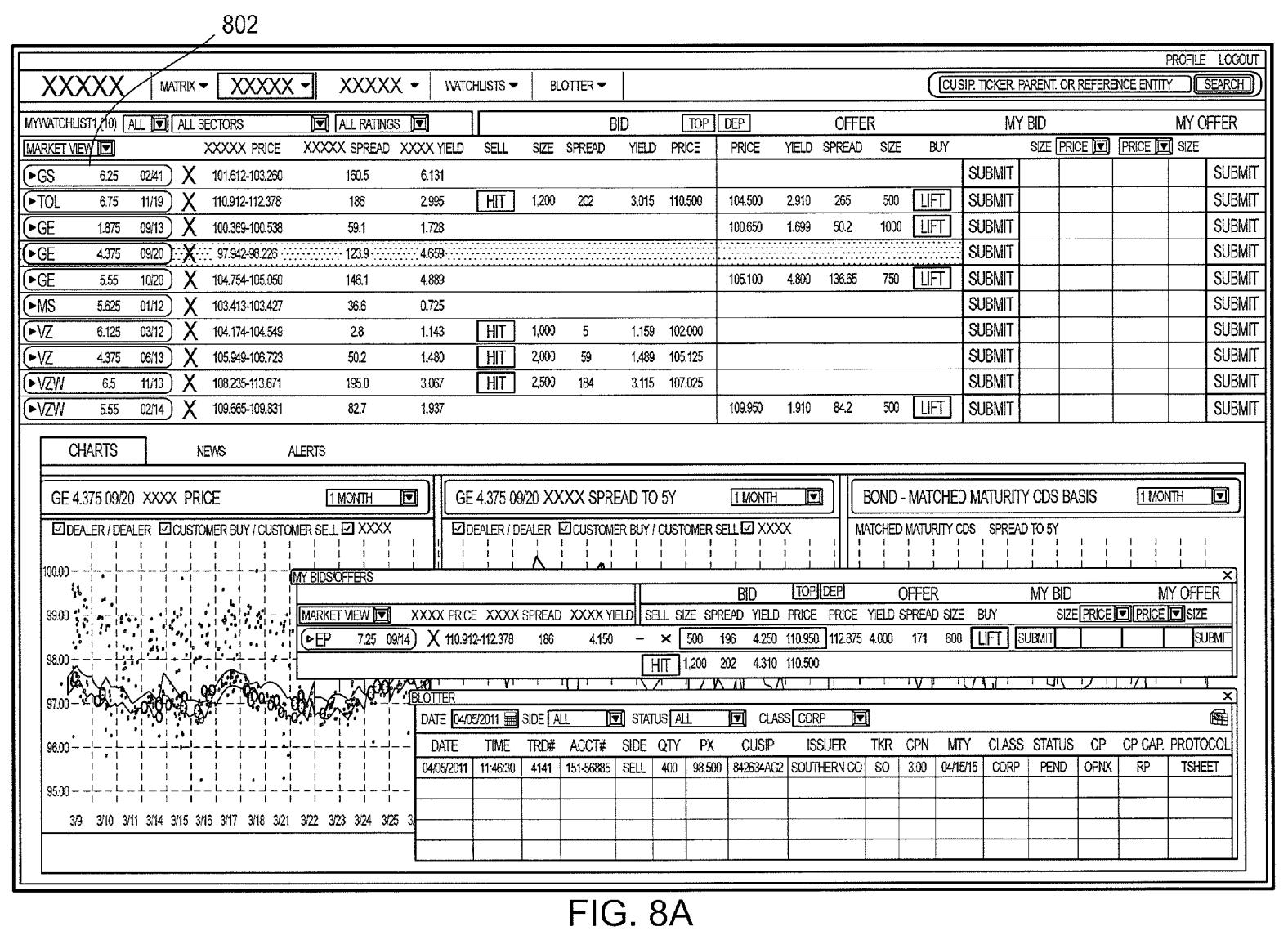

FIG. 8A, for example, includes a list 802 of bonds that the initiating party can select among to have RFQs sent out to one or more potential counterparties. In the illustrated screenshot, the line associated with (GE 4.375 09/20) is marked in a manner indicating that (GE 4.375 09/20) is being selected by the initiating party. A variety of other information is provided on this screen as well.

Figure 8B:
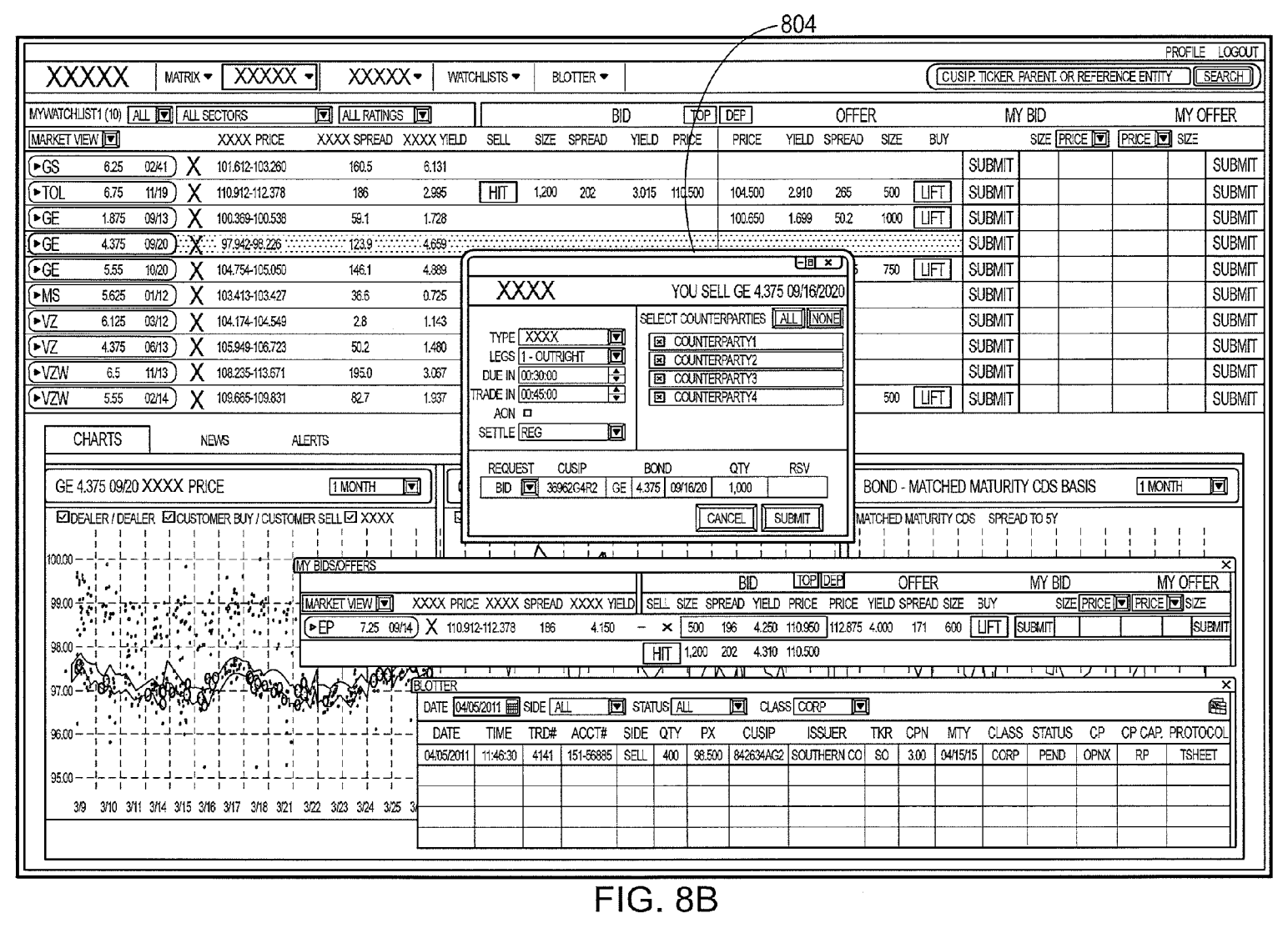

Referring now to FIG. 8B, when the initiating party selects (GE 4.375 09/20), a dialog box 804 opens, in which the initiating party can select one or more specific counterparties as well as other information, as indicated, that may be relevant to the proposed transaction.

Figure 8C:
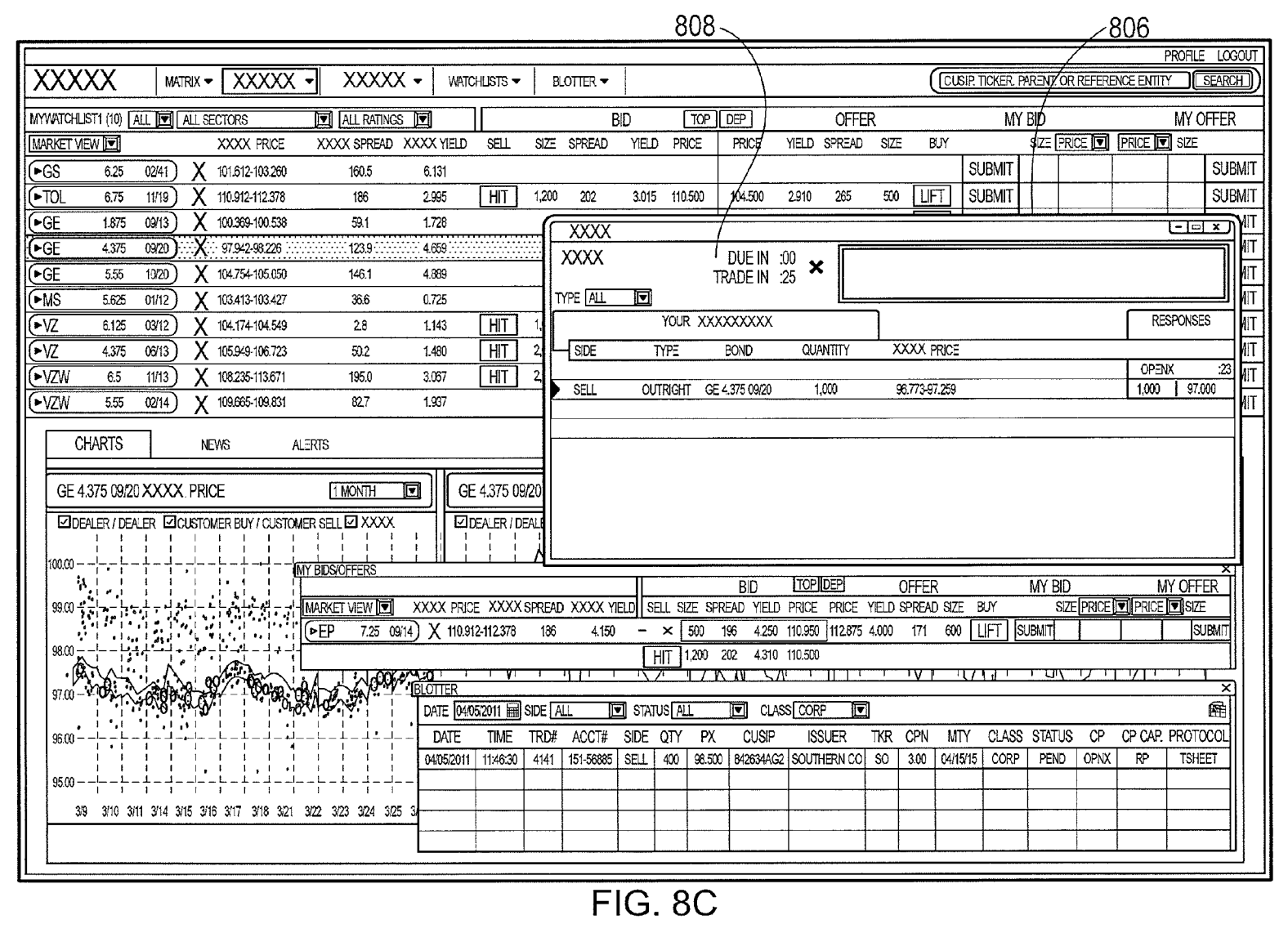

In FIG. 8C, the initiating party is shown in box 806 a proposed trade with a potential counterparty. In some implementations, this box 806 shows the best proposed trades as they are submitted, and if applicable, with the time remaining at 808 to accept each proposal.

Figure 8D:
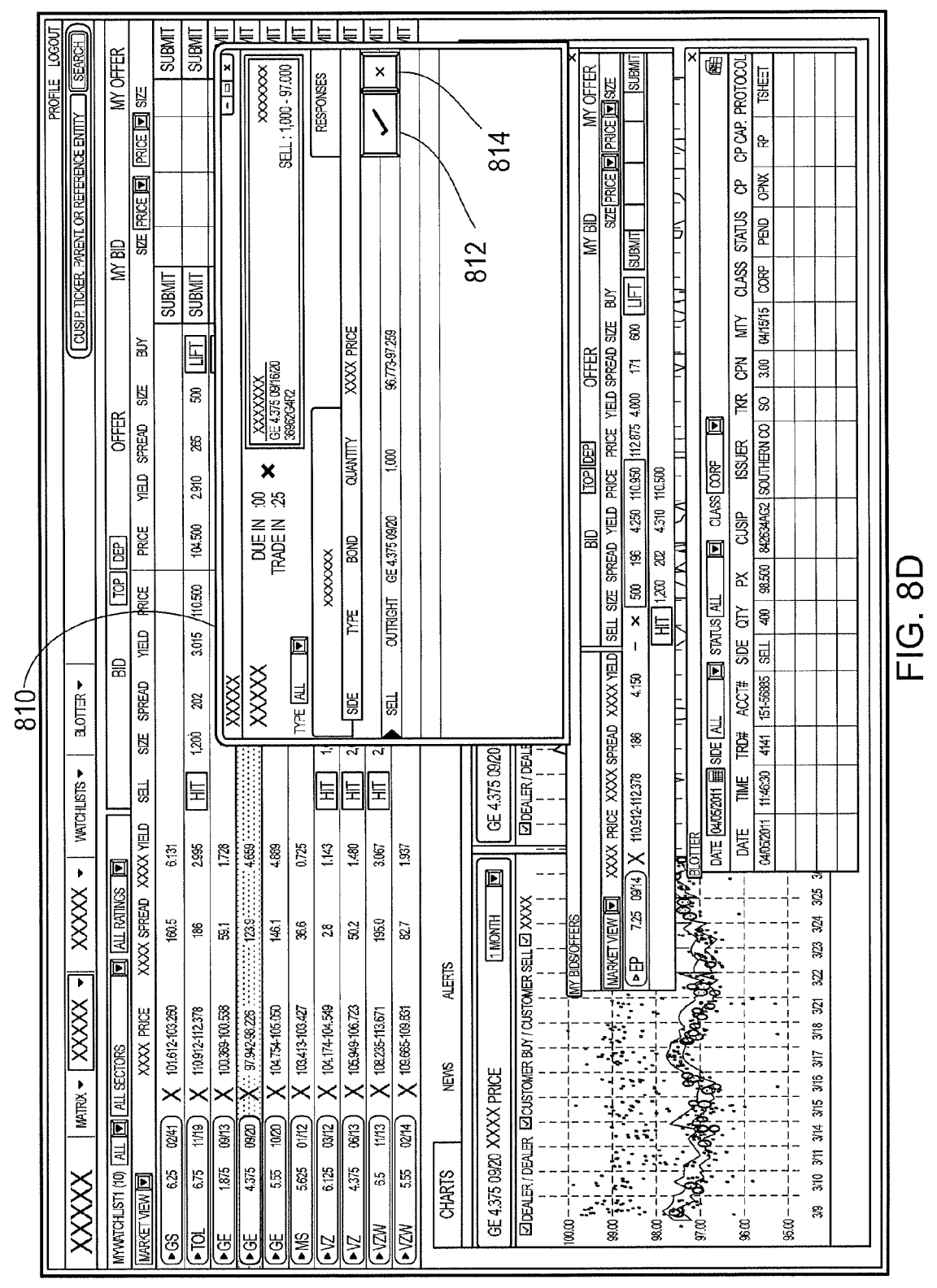

FIG. 8D shows the final trade proposal 810 offered to the initiating party, which can be accepted (by clicking the check 812) or rejected (by clicking the "x" 814).

Figure 8E:
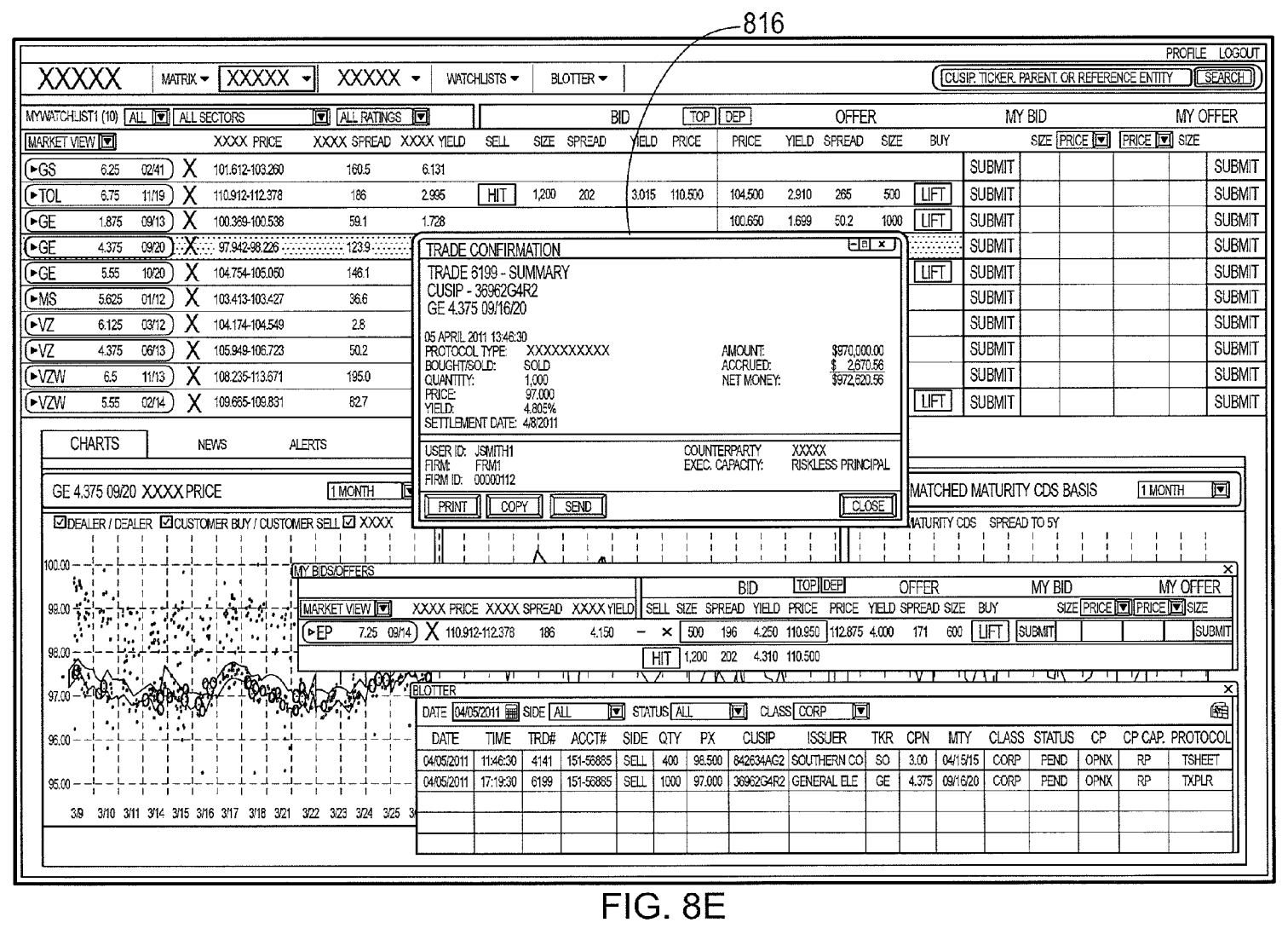

FIG. 8E provides a trade confirmation box 816 that appears if the final trade proposal is accepted by the initiating party. The illustrated trade confirmation box 816 confirms various details of the transaction. The confirmation typically will identify the system administrator as the counterparty, a riskless principal, and maintain the anonymity of the counterparty to the financial transaction.

Figure 8F:
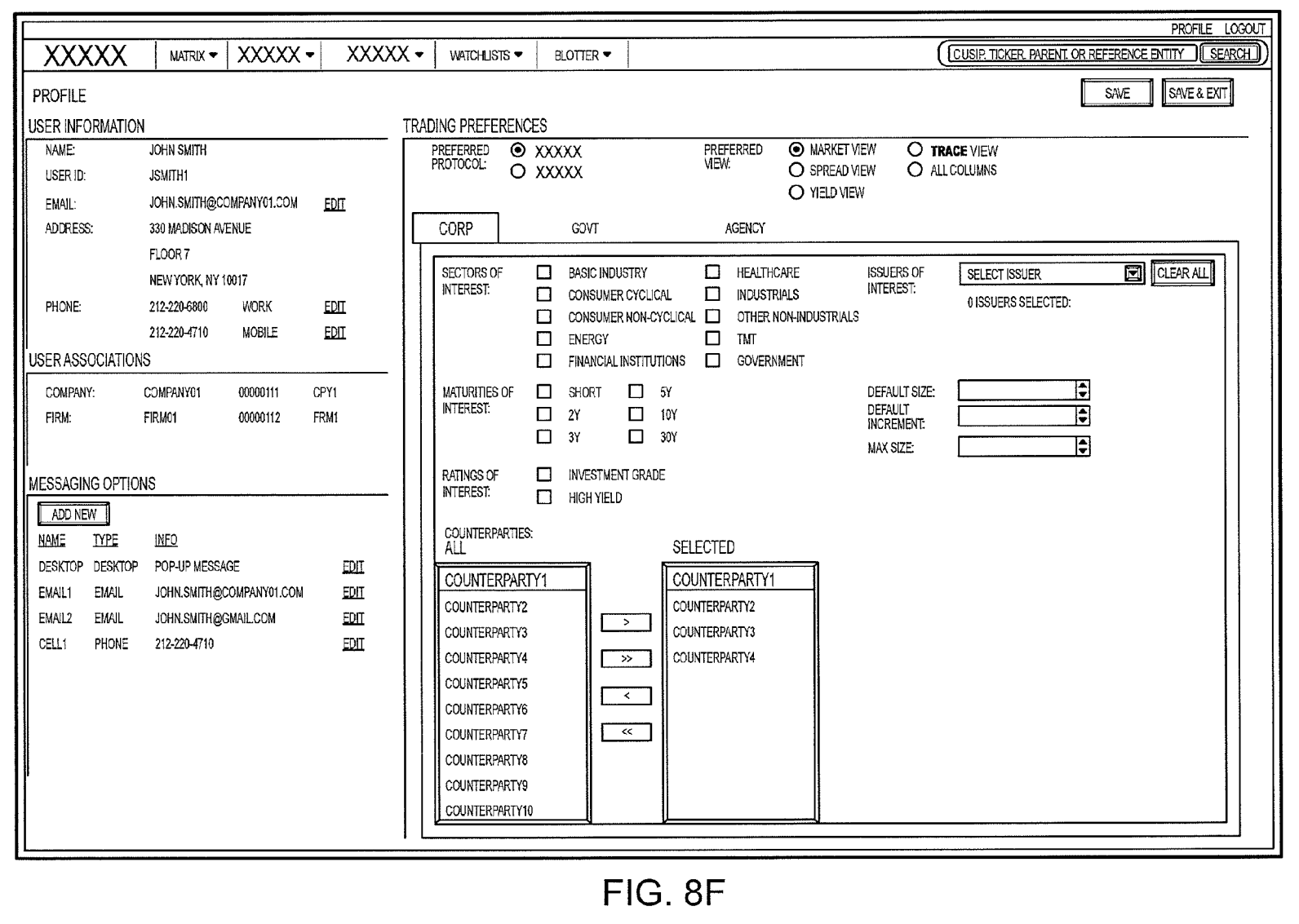

FIG. 8F shows an example of a screenshot that enables the initiating party, for example, to selecting preferences. This includes profile pieces that are used in the functionality disclosed herein.

A number of embodiments of the invention have been described. Nevertheless, it will be understood that various modifications may be made without departing from the spirit and scope of the invention.

For example, the specific appearance of the screenshots can vary considerably.

Additionally, certain aspects of the functionality disclosed can be performed without a computer.

The specific data collected and analyzed in connection with the various functions disclosed herein can differ from what is explicitly disclosed. For example, in some implementations, other factors beyond those explicitly disclosed herein may be considered in assigning confidence scores to the potential counterparties. Similarly, in some implementations, fewer factors may be considered.

Likewise, the points added and corresponding weighting factors used in calculating the confidence scores may differ from those explicitly disclosed herein.

In some implementations, the order book functionality disclosed herein may be omitted or performed by an entirely separate system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Accordingly, other implementations are within the scope of the claims.

What is claimed is:

1. A computer-based method for facilitating a transfer of a fixed income security, the computer-based method comprising:

receiving an indication from a computer-based interface device that an initiating party seeks a counterparty for a financial transaction involving the transfer of the fixed income security;

accessing data in an electronic database relating to a plurality of potential counterparties for the financial transaction; and assigning, based on the data in the electronic database, to one or more of the plurality of potential counterparties an indication of likelihood that the potential counterparty will engage in the financial transaction, wherein assigning the indication of likelihood comprises determining, based on the data in the electronic database, one or more of the following:

to what degree the potential counterparty involved in current bids related to the fixed income security, to what degree the potential counterparty was involved in past bids related to the fixed income security, to what degree the potential counterparty was involved in completed transactions related to the fixed income security, to what degree the potential counterparty has expressed interest related to the fixed income security, and to what degree the potential counterparty has portfolio holdings related to the fixed income security, wherein determining to what degree the potential counterparty was involved in past bids related to the fixed income security comprises determining, based on the data in the electronic database, one or more of the following:

to what degree the potential counterparty was involved in past bids for the fixed income security, to what degree the potential counterparty was involved in past bids for different fixed income securities with the same issuer as the fixed income security, to what degree the potential counterparty was involved in past bids for different fixed income securities in the same industry as the fixed income security, to what degree the potential counterparty was involved in past bids for different fixed come securities in the same maturity bracket as the fixed income security, to what degree the potential counterparty was involved in past bids for different fixed income securities with the same rating as the fixed income security, and to what degree the potential counterparty was involved in past bids for different fixed income securities with the same yield percentage as the fixed income security.

2. The computer-based method of claim 1 further comprising:

ranking the plurality of potential counterparties based on the indication of likelihood assigned to each respective one of the potential counterparties.

3. The computer-based method of claim 2 further comprising:

enabling the initiating party to view at a computer-based interface device one or both of:

the assigned indications of likelihood that the respective potential counterparties will engage in the financial transaction; and the rankings of each potential counterparty based in the assigned indications of likelihood.

4. The computer-based method of claim 1 further comprising:

enabling the initiating party to enter a request at the computer-based interface device that a Request For Quote (RFQ) be sent to a specified one or more potential counterparties identified by the initiating party to enter into the financial transaction.

5. The computer-based method of claim 4 further comprising:

sending an inquiry over the computer network as to actual interest in participating in the financial transaction to:

each of the specified one or more of potential counterparties, if any, and one or more of the potential counterparties with the highest assigned indication of likelihood that the potential counterparty will engage in the financial transaction.

6. The computer-based method of claim 5 wherein sending the inquiries is accomplished without revealing an identity of the initiating party.

7. The computer-based method of claim 5 further comprising:

receiving one or more responses to the inquiries sent from one or more of the potential counterparties; and enabling the initiating party to access information about the one or more responses at the computer-based interface device.

8. The computer-based method of claim 7 wherein enabling the initiating party to access the information is accomplished without revealing an identity of the responding potential counterparties at the computer-based device.

9. The computer-based method of claim 7 wherein receiving the one or more responses to the inquiries comprises receiving a plurality of responses, the method further comprising:

combining two or more of the responses to create a single offer that satisfies requirements associated with completing the financial transaction based on information provided by the initiating party.

10. The computer-based method of claim 9 further comprising:

enabling the initiating party to view information about the single offer at the computer-based interface device.

11. The computer-based method of claim 9 further comprising:

enabling the potential counterparties, in responding to the inquiries, to specify an expiration time for an offer contained in their response, wherein at least one of the responses combined to create the single offer has a specified expiration time and the information about the single offer changes upon expiration of the specified expiration time.

12. The computer-based method of claim 1 wherein assigning to each respective one of the plurality of potential counterparties an indication of likelihood that the potential counterparty will engage in the financial transaction further comprises:

determining, based on the data in the electronic database, to what degree the potential counterparty is or was on the opposite side of other transactions from the side of the transaction desired.

13. The computer-based method of claim 1 wherein determining to what degree the potential counterparty is involved in current bids related to the fixed income security comprises:

determining, based on the data in the electronic database, one or more of the following:

to what degree the potential counterparty is involved in current bids for the fixed income security, to what degree the potential counterparty is involved in current bids for different fixed income securities with the same issuer as the fixed income security, to what degree the potential counterparty is involved in current bids for different fixed income securities in the same industry as the fixed income security, to what degree the potential counterparty is involved in current bids for different fixed income securities in the same maturity bracket as the fixed income security, to what degree the potential counterparty is involved in current bids for different fixed income securities with the same rating as the fixed income security, and to what degree the potential counterparty is involved in current bids for different fixed income securities with the same yield percentage as the fixed income security.

14. The computer-based method of claim 1 wherein determining to what degree the potential counterparty was involved in completed transactions related to the fixed income security comprises:

determining, based on the data in the electronic database, one or more of the following:
  to what degree the potential counterparty has completed transactions including the fixed income security,
  to what degree the potential counterparty has completed transactions including different fixed income securities with the same issuer as the fixed income security,
  to what degree the potential counterparty has completed transactions including different fixed income securities in the same industry as the fixed income security,
  to what degree the potential counterparty has completed transactions including different fixed income securities in the same maturity bracket as the fixed income security,
  to what degree the potential counterparty has completed transactions including different fixed income securities with the same rating as the fixed income security, and
  to what degree the potential counterparty has completed transactions including different fixed income securities with the same yield percentage as the fixed income security.

15. The computer-based method of claim 1 wherein determining to what degree the potential counterparty has portfolio holdings related to the fixed income security comprises:
  determining, based on the data in the electronic database, one or more of the following:
    to what degree the portfolio of the potential counterparty includes the fixed income security,
    to what degree the portfolio of the potential counterparty includes different fixed income securities with the same issuer as the fixed income security,
    to what degree the portfolio of the potential counterparty includes different fixed income securities in the same industry as the fixed income security,
    to what degree the portfolio of the potential counterparty includes different fixed income securities in the same maturity bracket as the fixed income security,
    to what degree the portfolio of the potential counterparty includes different fixed income securities with the same rating as the fixed income security, and
    to what degree the portfolio of the potential counterparty includes different fixed income securities with the same yield percentage as the fixed income security.

16. The computer-based method of claim 1 further comprising:
  enabling the initiating party and each of the plurality of potential counterparties to create respective virtual profiles, each of which includes an expression of interest in one or more characteristics associated with fixed income securities,
  wherein assigning to each respective one of the plurality of potential counterparties an indication of likelihood that the potential counterparty will engage in the financial transaction further comprises determining to what degree a virtual profile associated with one of the potential counterparties includes an expression of interest in the fixed income security.

17. The computer-based method of claim 16 wherein determining to what degree the potential counterparty has expressed interest an interest related to the fixed security comprises:
  determining, based on the data in the electronic database, one or more of the following:
    to what degree the virtual profile associated with the potential counterparty includes an expression of interest in the fixed income security,
    to what degree the virtual profile associated with the potential counterparty includes expressions of interest in different fixed income securities with the same issuer as the fixed income security,
    to what degree the virtual profile associated with the potential counterparty includes expressions of interest in different fixed income securities in the same industry as the fixed income security,
    to what degree the virtual profile associated with the potential counterparty includes expressions of interest in different fixed income securities in the same maturity bracket as the fixed income security,
    to what degree the virtual profile associated with the potential counterparty includes expressions of interest in different fixed income securities with the same rating as the fixed income security, and
    to what degree the virtual profile associated with the potential counterparty includes expressions of interest in different fixed income securities with the same yield percentage as the fixed income security.

18. The computer-based method of claim 1 further comprising:
  automatically inquiring, over the computer network, to what degree a selected one of the potential counterparties has an interest in conducting the financial transaction,
  wherein the automatic inquiry is in response to a determination, based on the data in the electronic database, that the selected potential counterparty is or was involved in a bid for the fixed income security or completed a transaction for the fixed income security.

19. The computer-based method of claim 1 further comprising:
  enabling the initiating party and the potential counterparties to post and view orders at an electronic order book that is accessible from computer terminals coupled to the computer network.

20. A computer system to facilitate a financial transaction involving a transfer of a fixed income security, the computer system comprising:
  one or more user devices; and
  one or more computers operable to interact via a computer network with the one or more user devices,
  wherein the one or more computers comprise:
    a sales engine to receive an indication from a first one of the user devices that an initiating party seeks a counterparty for the financial transaction involving the transfer of the fixed income security;
    a matching engine to:
      access, in an electronic database, data relating to a plurality of potential counterparties for the financial transaction; and
      assign, based on the data in the electronic database, to one or more of the potential counterparties an indication of likelihood that the potential counterparty will engage in the financial transaction,
      wherein the matching engine in assigning the indication of likelihood that the potential counterparty will engage in the financial transaction, is configured to determine, based on data in the electronic database, one or more of the following:
        to what degree the potential counterparty is involved in current bids related to the fixed income security,
        to what degree the potential counterparty was involved in past bids related to the fixed income security, to what degree the potential counterparty was involved in completed transactions related to the fixed income security, to what degree the potential counterparty has expressed interest related to the fixed income security, and to what degree the potential counterparty has portfolio holdings related to the fixed income security, wherein the matching engine, in determining to what degree the potential counterparty was involved in past bids related to the fixed income security, is configured to determine one or more of the following:

to what degree the potential counterparty was involved past bids for the fixed income security, to what degree the potential counterparty was involved in past bids for different fixed income securities with the same issuer as the fixed income security, to what degree the potential counterparty was involved in past bids for different fixed income securities in the same industry as the fixed income security, to what degree the potential counterparty was involved in past bids for different fixed income securities in the same maturity bracket as the fixed income security, to what degree the potential counterparty was involved in past bids for different fixed income securities with the same rating as the fixed income security, and to what degree the potential counterparty was involved in past bids for different fixed income securities with the same yield percentage as the fixed income security.

21. The computer system of claim 20 wherein the matching engine is further configured to rank the potential counterparties based on the indications of likelihood assigned to each respective one of the potential counterparties.

22. The computer system of claim 21 wherein the one or more computers is further adapted to enable the initiating party to view at the first one of the user devices at least one of:
the assigned indications of likelihood that the respective potential counterparties will engage in the financial transaction; and
the ranking of the plurality of potential counterparties.

23. The computer system of claim 20 wherein the one or more computers are further configured to enable the initiating party to enter a request at the first one of the user devices that a Request For Quote (RFQ) be sent to one or more potential counterparties specifically identified by the initiating party to enter into the financial transaction.

24. The computer system of claim 23 wherein the sales engine is further configured to send a request to:
each of the one or more potential counterparties specifically identified by the initiating party, if any; and
one or more of the potential counterparties having the highest assigned indications of likelihood that the potential counterparty will engage in the financial transaction.

25. The computer system of claim 24 wherein the sales engine sends the requests without revealing the initiating party's identity to potential counterparties receiving the requests.

26. The computer system of claim 24 wherein the sales engine:

receives one or more responses to the inquiries sent from one or more of the potential counterparties, and
the one or more computers are configured to make the responses available for viewing by the initiating party at the first one of the user devices.

27. The computer system of claim 26 wherein making the responses available for viewing by the initiating party at the first one of the user devices is accomplished without revealing an identity of the responding potential counterparties at the first one of the user devices.

28. The computer system of claim 26 wherein the one or more computers further comprise:
a price aggregation engine to combine two or more of the responses to create a single offer that satisfies requirements associated with completing the financial transaction based on information provided by the initiating party.

29. The computer system of claim 28 wherein the one or more computers are further configured to make information about the single offer available for viewing at the first one of the user devices.

30. The computer system of claim 29 wherein the one or more computers are further configured to:
enable the potential counterparties, in responding to the inquiries, to specify an expiration time for an offer contained in their response,
wherein at least one of the responses combined to create the single offer has a specified expiration time and the information about the single offer changes upon expiration of the specified expiration time.

31. The computer system of claim 20 wherein the matching engine, in assigning to each respective one of the plurality of potential counterparties an indication of likelihood that the potential counterparty will engage in the financial transaction, is configured to determine, based on the data in the electronic database, whether the potential counterparty is or was on the opposite side of other transactions from the side of the transaction desired.

32. The computer system of claim 20 wherein the matching engine, in determining to what degree the potential counterparty is involved in a current bid related to the fixed income security, is configured to determine one or more of the following:

to what degree the potential counterparty is involved in current bids for the fixed income security, to what degree the potential counterparty is involved in current bids for different fixed income securities with the same issuer as the fixed income security, to what degree the potential counterparty is involved in current bids for different fixed income securities in the same industry as the fixed income security, to what degree the potential counterparty is involved in current bids for different fixed income securities in the same maturity bracket as the fixed income security, to what degree the potential counterparty is involved in current bids for different fixed income securities with the same rating as the fixed income security, and to what degree the potential counterparty is involved in current bids for different fixed income securities with the same yield percentage as the fixed income security.

33. The computer system of claim 20 wherein the matching engine, in determining to what degree the potential counterparty was involved in completed transactions related to fixed income securities, is configured to determine one or more of the following:

to what degree the potential counterparty has completed transactions including the fixed income security, to what degree the potential counterparty has completed transactions including different fixed income securities with the same issuer as the fixed income security, to what degree the potential counterparty has completed transactions including different fixed income securities in the same industry as the fixed income security, to what degree the potential counterparty has completed transactions including different fixed income securities in the same maturity bracket as the fixed income security, to what degree the potential counterparty has completed transactions including different fixed income securities with the same rating as the fixed income security, and to what degree the potential counterparty has completed transactions including different fixed income securities with the same yield percentage as the fixed income security.

34. The computer system of claim 20 wherein the matching engine, in determining to what degree the potential counterparty has portfolio holdings related to the fixed income security, is configured to determine one or more of the following:

to what degree the portfolio of the potential counterparty includes the fixed income security, to what degree the portfolio of the potential counterparty includes different fixed income securities with the same issuer as the fixed income security, to what degree the portfolio of the potential counterparty includes different fixed income securities in the same industry as the fixed income security, to what degree the portfolio of the potential counterparty includes different fixed income securities in the same maturity bracket as the fixed income security, to what degree the portfolio of the potential counterparty includes different fixed income securities with the same rating as the fixed income security, and to what degree the portfolio of the potential counterparty includes different fixed income securities with the same yield percentage as the fixed income security.

35. The computer system of claim 20 wherein the one or more computers are further configured to:

enable the initiating party and each of the plurality of potential counterparties to create respective virtual profiles, each of which includes an expression of interest in one or more characteristics associated with fixed income securities, wherein assigning to each respective one of the plurality of potential counterparties an indication of likelihood that the potential counterparty will engage in the financial transaction further comprises determining to what degree a virtual profile associated with one of the potential counterparties includes an expression of interest in the fixed income security.

36. The computer system of claim 35 wherein the matching engine, in determining to what degree the potential counterparty has expressed interest related to the fixed income security, is configured to determine one or more of the following:

to what degree the virtual profile associated with the potential counterparty includes an expression of interest in the fixed income security, to what degree the virtual profile associated with the potential counterparty includes expressions of interest in different fixed income securities with the same issuer as the fixed income security, to what degree the virtual profile associated with the potential counterparty includes expressions of interest in different fixed income securities in the same industry as the fixed income security, to what degree the virtual profile associated with the potential counterparty includes expressions of interest in different fixed income securities in the same maturity bracket as the fixed income security, to what degree the virtual profile associated with the potential counterparty includes expressions of interest in different fixed income securities with the same rating as the fixed income security, and to what degree the virtual profile associated with the potential counterparty includes expressions of interest in different fixed income securities with the same yield percentage as the fixed income security.

37. The computer system of claim 20, wherein the sales engine is further adapted to:

automatically inquire, via the computer network, to what degree a selected one of the potential counterparties wants to conduct the financial transaction in response to a determination, based on the data in the electronic database, that the selected potential counterparty is or was involved in a bid for the fixed income security or completed a transaction for the fixed income security.

38. The computer system of claim 20, wherein the one or more computers are further configured to enable the initiating party and the potential counterparties to post and view orders at an electronic order that is accessible from computer terminals coupled to the computer network.

39. The computer system of claim 20, wherein the one or more user devices comprise a computing device running one or more of a web browser, a spreadsheet add-in, an order management system, an application programming interface, and a financial information exchange program.

* * * * *